(12) United States Patent
Wang et al.

(10) Patent No.: US 11,740,325 B2
(45) Date of Patent: Aug. 29, 2023

(54) VEHICLE-MOUNTED RADAR CALIBRATION DEVICE AND METHOD

(71) Applicant: AUTEL INTELLIGENT TECHNOLOGY CORP., LTD., Guangdong (CN)

(72) Inventors: Xiaolong Wang, Guangdong (CN); Longxue Qiu, Guangdong (CN); Jin Chen, Guangdong (CN); Xinguang Tang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 46 days.

(21) Appl. No.: 17/452,278

(22) Filed: Oct. 26, 2021

(65) Prior Publication Data
US 2022/0043110 A1    Feb. 10, 2022

Related U.S. Application Data

(63) Continuation of application No. 16/910,750, filed on Jun. 24, 2020, now Pat. No. 11,175,381, which is a
(Continued)

(30) Foreign Application Priority Data

Dec. 25, 2017   (CN) .......................... 201711421901.8
Dec. 25, 2017   (CN) .......................... 201721838188.2

(51) Int. Cl.
    *G01S 7/40*    (2006.01)
    *G01S 13/931*    (2020.01)
    *G01S 7/02*    (2006.01)

(52) U.S. Cl.
CPC .............. *G01S 7/40* (2013.01); *G01S 13/931* (2013.01); *G01S 7/027* (2021.05); *G01S 2013/93271* (2020.01)

(58) Field of Classification Search
None
See application file for complete search history.

(56) References Cited

U.S. PATENT DOCUMENTS

| 6,363,619 | B1 | 4/2002 | Schirmer et al. |
| 9,625,091 | B1 | 4/2017 | Massey |
| | | (Continued) | |

FOREIGN PATENT DOCUMENTS

| CN | 1429334 A | 7/2003 |
| CN | 107449461 A | 12/2017 |
| | (Continued) | |

OTHER PUBLICATIONS

The International Search Report dated Mar. 19, 2019; PCT/CN2018/122158 with English Translation.
(Continued)

*Primary Examiner* — Whitney Moore

(57) ABSTRACT

The present invention relates to the technical field of vehicle maintenance and device calibration, and discloses a vehicle-mounted radar calibration device and method. The vehicle-mounted radar calibration device includes a bracket apparatus and a radar calibration component. The radar calibration component is configured to be installed on the bracket apparatus and includes a base board. After calibration on the vertical plane of the base board is completed, the radar calibration component is configured to reflect a radar wave, emitted by a vehicle-mounted radar of a to-be-calibrated vehicle, to the vehicle-mounted radar, to calibrate the vehicle-mounted radar. In the present invention, after the vertical plane of the base board is calibrated, the radar calibration component is used to reflect the radar wave emitted by the vehicle-mounted radar to the vehicle-mounted radar.

17 Claims, 12 Drawing Sheets

Related U.S. Application Data continuation of application No. PCT/CN2018/122158, filed on Dec. 19, 2018.

(56) References Cited

U.S. PATENT DOCUMENTS

| | | |
|---|---|---|
| 2013/0110314 A1 | 5/2013 | Stieff |
| 2020/0149935 A1* | 5/2020 | Qiu .......................... G01S 7/497 |

FOREIGN PATENT DOCUMENTS

| | | |
|---|---|---|
| CN | 107843883 A | 3/2018 |
| CN | 207557464 U | 6/2018 |
| EP | 0984297 A2 | 3/2000 |
| EP | 0984297 A3 | 8/2001 |
| EP | 1260832 A1 | 11/2022 |

OTHER PUBLICATIONS

The Partial Supplementary European Search Report dated Jul. 27, 2021; Appln. No. 18894500.0.

* cited by examiner

VEHICLE-MOUNTED RADAR CALIBRATION DEVICE AND METHOD

CROSS REFERENCE OF RELATED APPLICATIONS

This application is a continuation application of U.S. application Ser. No. 16/910,750, filed on Jun. 24, 2020, which is a continuation of International Patent Application No. PCT/CN2018/122158 filed on Dec. 19, 2018, which claims priority to Chinese Patent Application No. 201721838188.2 filed on Dec. 25, 2017, and Chinese Patent Application No. 201711421901.8 filed on Dec. 25, 2017, both of which are incorporated by reference herein in their entireties.

BACKGROUND

Technical Field

The present application relates to the technical field of vehicle maintenance and device calibration, and in particular, to a vehicle-mounted radar calibration device and method.

Related Art

In the field of automobile advanced driver assistant systems (ADAS), adaptive cruise control (ACC) is a universally used auxiliary function. The specific working principle of ACC is that distance measurement is performed on a front vehicle in real time through a vehicle-mounted radar, the speed of the vehicle where the radar is mounted is compared with the speed of the front vehicle, and moreover, power systems, such as a throttle and a brake, of the vehicle where the radar is mounted are controlled, thereby maintaining a constant safe distance between the vehicle where the radar is mounted and the front vehicle. Therefore, the vehicle-mounted radar plays a crucial role in implementing functions of ACC. In addition to measurement performance of the radar itself, both a mounting position and a mounting angle of the radar determine the correctness and accuracy of ultimate measurement data of the radar. The foregoing mounting position and mounting angle may change due to uncontrollable factors such as vibration and collision generated in use of the vehicle. Therefore, calibration on a vehicle-mounted radar is at the core of the field of vehicle maintenance and device calibration, especially the ACC function calibration. Currently, calibration on a vehicle-mounted radar is mostly post-installation calibration. That is, after a vehicle is delivered to a user and the user has driven the vehicle for some time, a vehicle-mounted radar needs to be calibrated due to an objective reason.

During the implementation of the present invention, the inventor finds that most existing calibration tools are each specific to a single type of vehicles. That is, a calibration tool can only calibrate vehicle-mounted radars of a single type of vehicles. Meanwhile, existing calibration methods depend excessively on software to calculate a deviation angle and as a result, calibration needs to be repeated for several times, causing inconvenience in use.

SUMMARY

To resolve the above technical problem, embodiments of the present invention provide a vehicle-mounted radar calibration device and method in which calibration operations are convenient.

The embodiments of the present invention adopt the following technical solution to resolve the technical problem.

The vehicle-mounted radar calibration device includes a bracket apparatus and a radar calibration component, which is configured to be installed on the bracket apparatus. The radar calibration component includes a base board, an adjustment bracket, an adjustment rod, mounting brackets, and angle adjustment assemblies. The adjustment bracket is hinged to the adjustment rod. Each angle adjustment assembly includes a cam disc and a cam spring plate, the cam disc is provided with a cam groove, and the cam spring plate is fixedly installed in the cam groove, the cam spring plate comprises at least three through holes and each of a first positioning hole, a second positioning hole and a third positioning hole is aligned with a corresponding through hole. Each mounting bracket is provided with a convex column, the convex column is abutted against the cam spring plate, and a sliding friction occurs between the convex column and the cam spring plate when the convex column slides in the cam groove. The radar calibration component is configured to reflect a radar wave, emitted by a vehicle-mounted radar of a to-be-calibrated vehicle, to the vehicle-mounted radar after calibration on the vertical plane of the base board is completed, to calibrate the vehicle-mounted radar. The angle adjustment assemblies are configured to adjust the base board, so that the base board can stay in at least two positions and therefore the radar calibration component reflects the radar wave emitted by the vehicle-mounted radar to the vehicle-mounted radar in the at least two positions.

Optionally, the bracket apparatus includes guide rails.

The radar calibration component is configured to be installed on the guide rails and the radar calibration component can horizontally slide along the guide rails.

Optionally, the bracket apparatus includes a sliding component.

The sliding component is movably installed on the guide rails and can slide along the guide rails.

The radar calibration component is configured to be installed on the guide rails through the sliding component and the radar calibration component can horizontally slide with the sliding component along the guide rails.

Optionally, the bracket apparatus includes: a bracket assembly and a beam assembly.

The beam assembly is installed on the bracket assembly and can move in the vertical direction relative to the bracket assembly. The beam assembly includes the guide rails and the guide rails are horizontally disposed.

Optionally, the bracket assembly includes a bracket body and height adjustment components.

At least three height adjustment components are installed on a bottom surface of the bracket body and configured to adjust a horizontal angle of the entire bracket body and a pitching angle of the bracket body.

Optionally, there are three height adjustment components distributed as an isosceles triangle. The three height adjustment components are configured to collaboratively adjust the horizontal angle of the entire bracket body. The height adjustment component at the apex of the isosceles triangle is configured to adjust the pitching angle of the bracket body.

Optionally, the bracket assembly includes a base bracket and a pole bracket. One end of the pole bracket is connected to the base bracket. The base bracket supports the pole bracket.

The beam assembly is installed on the pole bracket.

The base bracket includes rolling wheels, the bracket body and the height adjustment components.

There are at least three rolling wheels installed on the bottom surface of the bracket body for convenience of moving the base bracket.

Optionally, the pole bracket includes a lifting screw rod.

The lifting screw rod is disposed in the vertical direction.

The beam assembly is sleeved on the lifting screw rod and fits the thread of the lifting screw rod. When rotating around the central axis of the lifting screw rod, the lifting screw rod can drive the beam assembly to move along the lifting screw rod in the vertical direction.

Optionally, the pole bracket includes a lifting guide rail.

The lifting guide rail includes poles disposed in the vertical direction.

The beam assembly is movably installed on the poles. The poles are configured to guide the beam assembly to move in the vertical direction.

Optionally, the lifting guide rail includes a rail installed on the pole in the horizontal direction.

One end of the lifting screw rod is installed on the rail and the other end of the lifting screw rod is installed on the bracket body.

Optionally, the lifting guide rail includes a rail and a bottom rail.

Two poles are disposed in the vertical direction, in parallel and at a preset interval. The rail is disposed in the horizontal direction and two ends of the rail are respectively installed on the two poles.

The bottom rail is fixedly installed on the bracket body and an end of each pole far away from the rail is fixedly installed on the bottom rail.

One end of the lifting screw rod is fixedly installed on the rail and the other end of the lifting screw rod is fixedly installed on the bottom rail.

Optionally, the pole bracket includes a height gauge. The height gauge is installed on the pole in the vertical direction and configured to measure a moving distance of the beam assembly in the vertical direction.

Optionally, the beam assembly includes a support component and the guide rails.

The support component includes a support body and a moving block.

The moving block is fixedly installed on the support body and sleeved on the lifting screw rod. The moving block fits the thread of the lifting screw rod.

The guide rails are fixedly installed on the support body in the horizontal direction.

Optionally, the pole bracket includes poles disposed in the vertical direction.

The support component includes sliding blocks fixedly installed on the support body. The sliding blocks are movably installed on the poles and can slide along the poles.

Optionally, two clamping portions respectively extend from two opposite sides of the support body. The two clamping portions are strip-shaped and disposed in the horizontal direction, in parallel and at a preset interval.

Two guide rails are respectively installed on the two clamping portions and disposed in the horizontal direction at a preset interval.

The sliding component is movably installed on the guide rails through a sliding bearing.

Optionally, the beam assembly includes a level instrument configured to check whether the guide rails are horizontally disposed.

The vehicle-mounted radar calibration device includes a bracket apparatus, and a radar calibration component. The radar calibration component is configured to be installed on the bracket apparatus. The radar calibration component includes a base board, an adjustment rod, and angle adjustment assemblies. Each angle adjustment assembly includes a first clasping piece, a second clasping piece, a cam disc, and pins. Wherein the first clasping piece being fixedly installed on the cam disc; the adjustment rod being clasped between the first clasping piece and the second clasping piece; one end of each pin penetrates through the first clasping piece and is fixed on the second clasping piece, locking the first clasping piece into the second clasping piece, so that the adjustment rod is clasped between the first clasping piece and the second clasping piece and the angle adjustment assembly rotates with the adjustment rod; the radar calibration component is configured to reflect a radar wave, emitted by a vehicle-mounted radar of a to-be-calibrated vehicle, to the vehicle-mounted radar after calibration on the vertical plane of the base board is completed, to calibrate the vehicle-mounted radar; and the angle adjustment assemblies are configured to adjust the base board, so that the base board can stay in at least two positions and therefore the radar calibration component reflects the radar wave emitted by the vehicle-mounted radar to the vehicle-mounted radar in the at least two positions.

The embodiments of the present invention further provides a vehicle-mounted radar calibration method including:

providing a radar calibration component and a bracket apparatus, where the radar calibration component is installed on the bracket apparatus and the radar calibration component comprises a base board;

calibrating the vertical plane of the base board, so that the base board is perpendicular to the central axis plane of a to-be-calibrated vehicle;

connecting an automobile ADAS diagnosis and analysis instrument to an on-board diagnostics system of the to-be-calibrated vehicle and turning on a vehicle-mounted radar of the to-be-calibrated vehicle, so that the vehicle-mounted radar emits a radar wave;

adjusting the position of the radar calibration component, so that the radar calibration component reflects the radar wave to the vehicle-mounted radar, and observing through the automobile ADAS diagnosis and analysis instrument; and obtaining mounting position deviations and dB value deviations of the vehicle-mounted radar through the automobile ADAS diagnosis and analysis instrument and adjusting the vehicle-mounted radar according to the guidance of the automobile ADAS diagnosis and analysis instrument, so that deviation values of the radar wave reflected to the vehicle-mounted radar fall within an allowable range.

Optionally, the adjusting the position of the radar calibration component, so that the radar calibration component reflects the radar wave to the vehicle-mounted radar, and observing through the automobile ADAS diagnosis and analysis instrument includes:

disposing the base board at an angle to the vertical direction, where the angle is less than an allowable angle deviation value of the vehicle-mounted radar, observing through the automobile ADAS diagnosis and analysis instrument and recording a mounting position deviation and a dB value deviation of the vehicle-mounted radar;

rotating the base board in a rotating direction around the fixed rotating shaft, so that the base board is vertically disposed and the central axis of the fixed rotating shaft is perpendicular to the central axis plane of the vehicle, observing through the automobile ADAS diagnosis and analysis instrument and recording a mounting position deviation and a dB value deviation of the vehicle-mounted radar; and rotating the base board in the rotating direction around the fixed rotating shaft, so that the base board is at an angle to the vertical direction, observing through the automobile ADAS diagnosis and analysis instrument and recording a mounting position deviation and a dB value deviation of the vehicle-mounted radar.

Optionally, the calibrating the vertical plane of the base board, so that the base board is perpendicular to the central axis plane of a to-be-calibrated vehicle includes:

providing a laser and a diaphragm, where the laser includes an emitting hole and the diaphragm is provided with a diaphragm groove, and placing the diaphragm between the laser and the radar calibration component;

turning on the laser, so that a laser beam is emitted through the emitting hole;

adjusting the diaphragm groove and the laser, so that the laser beam emitted by the laser is parallel with the central axis plane of the to-be-calibrated vehicle and runs through the diaphragm groove after being emitted in the horizontal direction; and adjusting the position of the radar calibration component, so that the laser beam is reflected back along an original route and is projected to the emitting hole.

Compared with the prior art, after the vertical plane of the base board is calibrated, the radar calibration component is used to reflect a radar wave emitted by the vehicle-mounted radar to the vehicle-mounted radar. Therefore, the radar calibration component can be used to calibrate vehicle-mounted radars of different types of vehicles, providing convenience in vehicle-mounted radar calibration.

In addition, the base board can stay in the first position, the second position and the third position. When the base board stays in these three positions, mounting position deviations and dB value deviations of the vehicle-mounted radar can be recorded separately and then accurately calibrated.

Moreover, calibration on the vertical plane of the base board can be implemented by using the radar calibration component, the diaphragm and the laser. The radar calibration component can be used not only to calibrate the vertical plane of the base board, but also to calibrate the vehicle-mounted radar. Therefore, the quantity of elements of the vehicle-mounted radar calibration device is reduced, costs are lowered and calibration operations are also simplified.

BRIEF DESCRIPTION OF THE DRAWINGS

One or more embodiments are exemplarily described through accompanying drawings corresponding to the one or more embodiments. These exemplary descriptions do not constitute any limitation on the embodiments. Elements having identical reference numerals in the accompanying drawings are represented as similar elements. Unless otherwise stated, the pictures in the accompanying drawings do not constitute any proportional limitation.

DETAILED DESCRIPTION

For ease of understanding the present invention, the present invention is described in further detail below with reference to the accompanying drawings and specific embodiments. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Terms such as "vertical", "horizontal", "left", "right", "inside", "outside" and similar expressions used in this specification are merely used for the purpose of description.

Unless otherwise defined, meanings of all technical and scientific terms used in this specification are the same as that usually understood by persons skilled in the technical field to which the present invention belongs. The terms used in this specification of the present invention are merely intended to describe specific implementations rather than limit the present invention. A term "and/or" used in this specification includes any or all combinations of one or more related listed items.

In addition, technical characteristics described in following different embodiments of the present invention may be combined with each other provided that there is no conflict.

Figure 1:
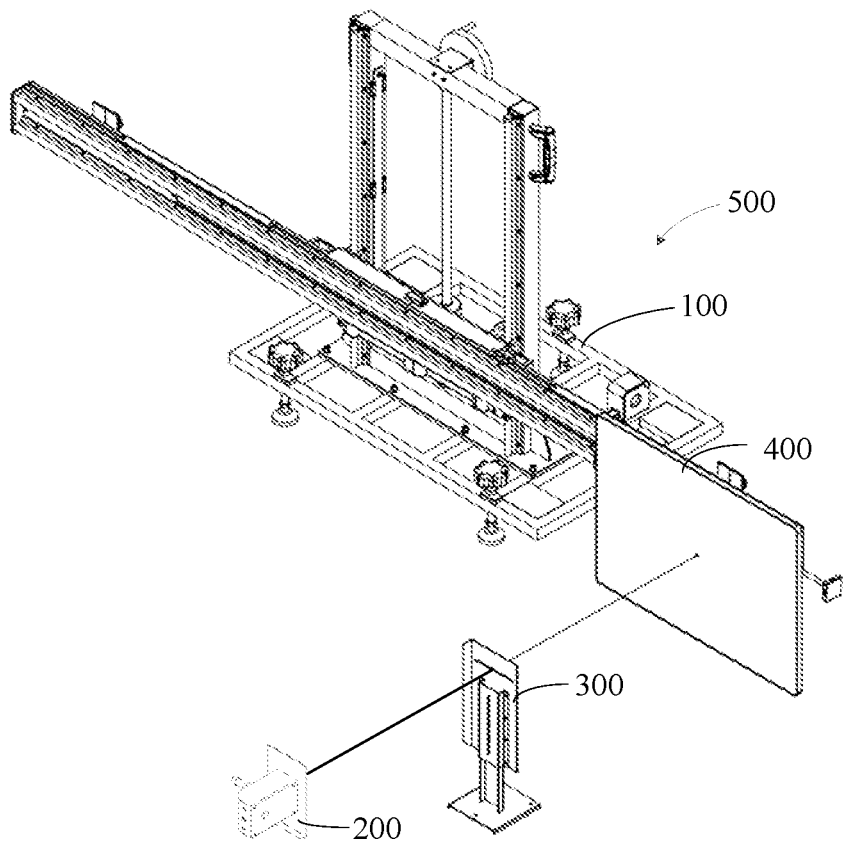
FIG. 1 is a three-dimensional view of a vehicle-mounted radar calibration device according to an embodiment of the present invention.

Referring to FIG. 1, a vehicle-mounted radar calibration device 500 provided in an embodiment of the present invention includes a bracket apparatus 100, a laser 200, a diaphragm 300 and a radar calibration component 400. The radar calibration component 400 is installed on the bracket apparatus 100 and can move relative to the bracket apparatus 100 in the horizontal direction or in the vertical direction. The bracket apparatus 100 is configured to support the radar calibration component 400. The laser 200 is configured to emit a laser beam. The diaphragm 300 is configured to control the laser beam to penetrate through the diaphragm 300. The radar calibration component 400 is configured to reflect the laser beam penetrating through the diaphragm 300 back to the laser 200 along an original route, to calibrate the vertical plane of the radar calibration component 400. The radar calibration component 400 is further configured to reflect a radar wave emitted by a vehicle-mounted radar, to calibrate a mounting position and a mounting angle of the vehicle-mounted radar.

Figure 2:
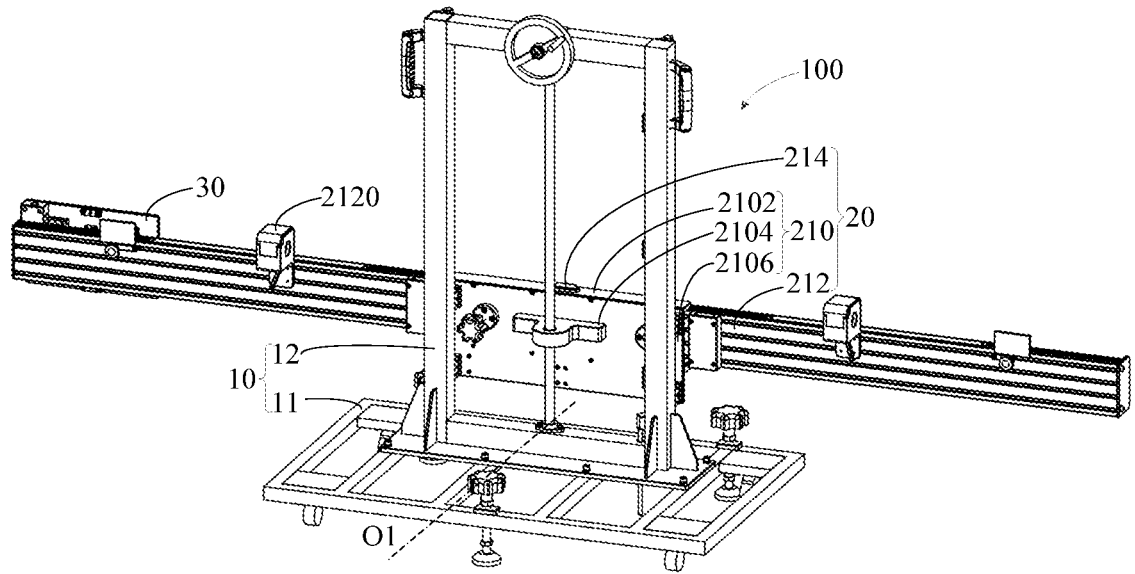
FIG. 2 is a three-dimensional view of a bracket apparatus of the calibration device shown in FIG. 1.

Referring to FIG. 2, the bracket apparatus 100 includes a bracket assembly 10, a beam assembly 20 and a sliding component 30. The beam assembly 20 is installed on the bracket assembly 10 and can move in the vertical direction relative to the bracket assembly 10. The sliding component 30 is installed on the beam assembly 20 and can move in the horizontal direction relative to the beam assembly 20. The radar calibration component 400 is installed on the sliding component 30 and can move with the sliding component 30 in the horizontal direction relative to the beam assembly 20.

The bracket assembly 10 includes a base bracket 11 and a pole bracket 12. One end of the pole bracket 12 is connected to the base bracket 11. The base bracket 11 supports the pole bracket 12.

Figure 3:
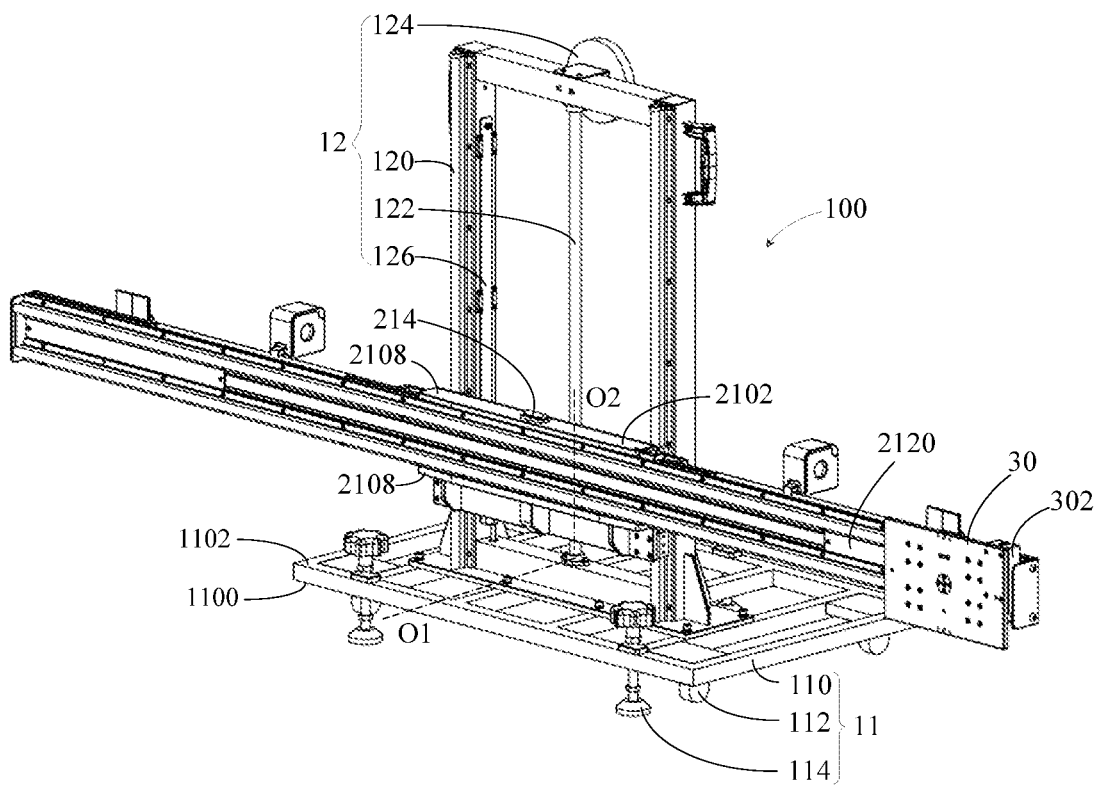
FIG. 3 is a three-dimensional view of the bracket apparatus shown in FIG. 2 from another angle of view.
Figure 4:
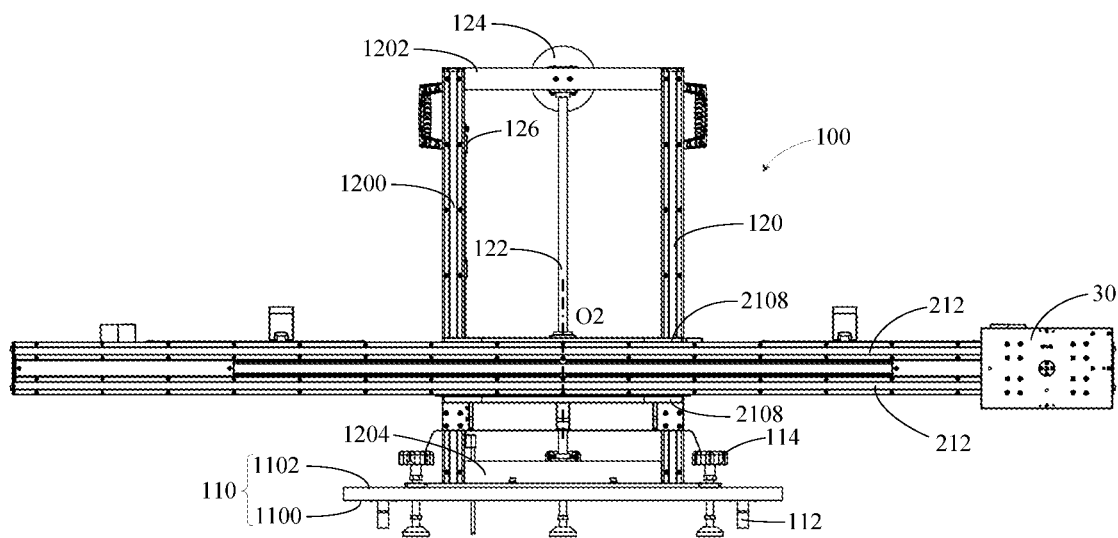
FIG. 4 is a front view of the bracket apparatus shown in FIG. 3.

Referring to FIG. 3 and FIG. 4 together, the base bracket 11 includes a bracket body 110, rolling wheels 112 and height adjustment components 114. The bracket body 110 is a rectangular plate and may be made of a metal material. To reduce the weight of the bracket body 110, a plurality of hollowed-out areas is formed. The bracket body 110 includes a bottom surface 1100 and an upper surface 1102 that are opposite to each other. The bracket body 110 has a central axis O1.

The rolling wheels 112 are installed on the bottom surface 1100 for convenience of moving the base bracket 11. In this embodiment, the rolling wheels 112 are omni-directional rolling wheels, so that the base bracket 11 can move forward, backward, left or right. There are four rolling wheels 112 respectively installed on four corners of the bracket body 110. It is understandable that in some other embodiments, the shape of the bracket body 110 is not limited to a rectangle and may change according to an actual requirement. For example, the bracket body 110 may be circular. The quantity of rolling wheels 112 may increase or decrease according to an actual requirement, provided that the quantity is at least three.

The height adjustment components 114 are installed on the bottom surface 1100 and configured to adjust the height of the bracket body 110. In this embodiment, the height adjustment components 114 are three adjustment hand wheels. The three adjustment hand wheels 114 are distributed as an isosceles triangle. Two adjustment hand wheels 114 on the base of the isosceles triangle are disposed on one side of the bracket body 110 and are symmetrically disposed along the central axis O1 of the bracket body 110. Another adjustment hand wheel 114 is disposed on another side of the bracket body 110 and on the central axis O1 of the bracket body 110 (that is, disposed on the apex of the isosceles triangle). The three adjustment hand wheels 114 can collaboratively adjust a horizontal angle of the entire bracket body 110. By individually adjusting the adjustment hand wheel 114 located on the central axis O1 of the bracket body 110, a pitching angle of the bracket body 110 can be adjusted.

It is understandable that the height adjustment components 114 may be other apparatuses capable of height adjustment. The quantity of height adjustment components 114 may increase according to an actual requirement, provided that the quantity is at least three and three of the at least three height adjustment components 114 are distributed as an isosceles triangle.

The pole bracket 12 includes a lifting guide rail 120, a lifting screw rod 122, a lifting rocking handle 124 and a height gauge 126.

The lifting guide rail 120 is installed on the bracket body 110. The lifting guide rail 120 includes poles 1200, a rail 1202 and a bottom rail 1204. Two poles 1200 are disposed in the vertical direction, in parallel and at a preset interval, and are configured to guide the beam assembly 20 to move in the vertical direction. The rail 1202 is disposed in the horizontal direction and two ends of the rail 1202 are respectively installed on the two poles 1200. The bottom rail 1204 is fixedly installed on the bracket body 110 and an end of each pole 1200 far away from the rail 1202 is fixedly installed on the bottom rail 1204.

It is understandable that in some other embodiments, the quantity of poles 1200 may increase or decrease according to an actual situation. For example, the quantity of poles 1200 may be one or three.

The lifting screw rod 122 is fixedly installed on the lifting guide rail 120 in the vertical direction. One end of the lifting screw rod 122 is fixedly installed on the rail 1202 and the other end of the lifting screw rod 122 is fixedly installed on the bottom rail 1204.

It is understandable that in some other embodiments, the bottom rail 1204 may be omitted. An end of each pole 1200 far away from the rail 1202 is fixedly installed on the bracket body 110. The lifting screw rod 122 is disposed in the vertical direction. One end of the lifting screw rod 122 is fixedly installed on the rail 1202 and the other end of the lifting screw rod 122 is fixedly installed on the bracket body 110.

The lifting rocking handle 124 is installed on the rail 1202, connected to the lifting screw rod 122 and configured to rotate, to drive the lifting screw rod 122 to rotate around the central axis of the lifting screw rod 122. In this embodiment, a connection rod of the lifting rocking handle 124 is perpendicular to the lifting screw rod 122 and connected to the lifting screw rod 122 through a gear structure. It is understandable that in some other embodiments, the connection rod of the lifting rocking handle 124 and the lifting screw rod 122 may be coaxial and the connection rod of the lifting rocking handle 124 is directly connected to the lifting screw rod 122. Alternatively, the lifting rocking handle 124 may be replaced with another apparatus configured to drive the lifting screw rod 122 to rotate, for example, a motor.

The height gauge 126 is installed on the poles 1200 in the vertical direction. The height gauge 126 has a scale and is configured to measure a moving distance of the beam assembly 20 in the vertical direction.

Referring to FIG. 2 and FIG. 3 again, the beam assembly 20 includes a support component 210, guide rails 212 and a level instrument 214. The support component 210 is installed on the lifting guide rail 120. Guided by the lifting guide rail 120, the support component 210 can move in the vertical direction relative to the lifting guide rail 120. The guide rails 212 are fixedly installed on the support component 210 and can move with the support component 210 in the vertical direction relative to the lifting guide rail 120.

The sliding component 30 is installed on the guide rails 212 and can move in the horizontal direction relative to the guide rails 212.

The support component 210 includes a support body 2102, a moving block 2104 and sliding blocks 2106.

The support body 2102 is roughly of a plate shape. Two clamping portions 2108 respectively extend from two opposite sides of the support body 2102. The two clamping portions 2108 are strip-shaped and disposed in the horizontal direction, in parallel and at a preset interval.

The moving block 2104 is fixedly installed on the support body 2102 and sleeved on the lifting screw rod 122. The moving block 2104 fits the thread of the lifting screw rod 122. When rotating around the central axis of the lifting screw rod 122, the lifting screw rod 122 can drive the moving block 2104 to move along the lifting screw rod 122 in the vertical direction, to drive the beam assembly 20 to move in the vertical direction. The moving block 2104 and the clamping portions 2108 are respectively located on two opposite sides of the support body 2102.

The sliding blocks 2106 are fixedly installed on the support body 2102. The sliding blocks 2106 and the moving block 2104 are located on a same side of the support body 2102. At least one sliding block 2106 is installed on each corresponding pole 1200. Each sliding block 2106 is movably installed on the corresponding pole 1200 and can slide along the corresponding pole 1200. In this embodiment, two sliding blocks 2106 are installed on each corresponding pole 1200. It is understandable that in some other embodiments, the quantity of sliding blocks 2106 installed on each corresponding pole 1200 may increase or decrease according to an actual requirement. For example, the quantity may be decreased to one or increased to three.

Two guide rails 212 are respectively installed on the two corresponding clamping portions 2108 and disposed in the horizontal direction at a preset interval. Each guide rail 212 is provided with a horizontal scale ruler 2120 extending towards the two sides with the center of the guide rail 212 being scale zero. That is, the scale value of the horizontal scale ruler 2120 is zero in the center of the guide rail 212 and the scale value increases gradually as the horizontal scale ruler extends towards the two sides of the guide rail 212, providing convenience in positioning the sliding component 30. The central axis O2 of the guide rail 212 and the central axis O1 of the bracket body 110 are on the same plane. It is understandable that in some other embodiments, the quantity of guide rails 212 may increase or decrease according to an actual requirement. For example, the quantity may be decreased to one or increased to three. The guide rails 212 may alternatively be fixedly installed on the support component 210 in any other appropriate manner. For example, the clamping portions 2108 are omitted and the guide rails 212 are directly welded onto the support body 2102.

The level instrument 214 is installed on the upper side of one of the clamping portions 2108 and configured to check whether the clamping portion 2108 is horizontally disposed, to determine whether the guide rails 212 are horizontally disposed. It is understandable that in some other embodiments, the level instrument 214 may alternatively be installed on the guide rails 212, or installed on other parts of the beam assembly 20, provided that the level instrument 214 can be configured to check whether the guide rails 212 are horizontally disposed.

The sliding component 30 is movably installed on the guide rails 212 and can slide along the guide rails 212 in the horizontal direction. In this embodiment, the sliding component 30 is movably installed on the guide rails 212 through a sliding bearing 302. The sliding component 30 includes a plurality of mounting points configured to install the radar calibration component 400. It is understandable that in some other embodiments, the sliding component 30 may alternatively be movably installed on the guide rails 212 in another appropriate manner. For example, the sliding bearing 302 is omitted and the sliding component 30 may be directly movably installed on the guide rails 212.

Figure 5:
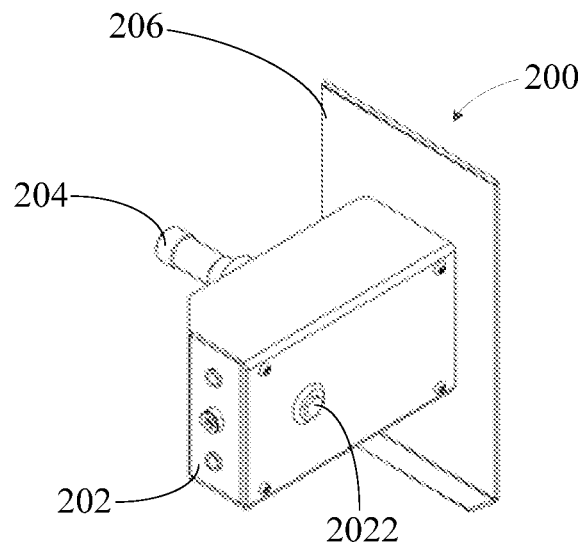
FIG. 5 is a three-dimensional view of a laser of the calibration device shown in FIG. 1.
Figure 6:
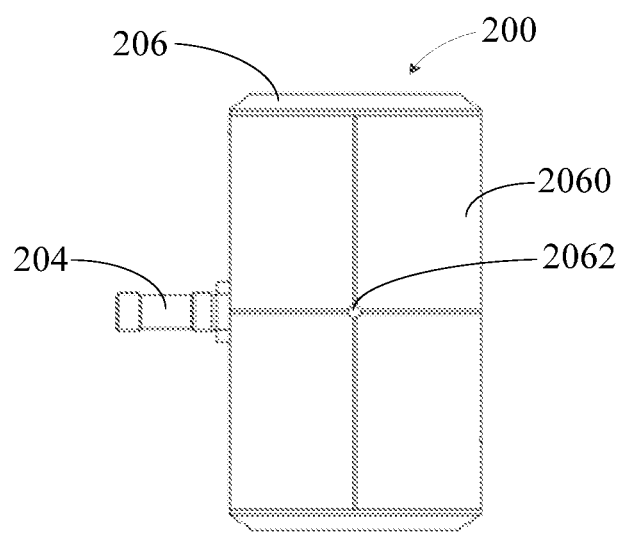
FIG. 6 is a three-dimensional view of the laser shown in FIG. 5 from another angle of view.

Referring to FIG. 5 and FIG. 6 together, the laser 200 is a wheel hub laser, including an emitting portion 202, a mounting shaft 204 and an observation target 206. The emitting portion 202 is configured to emit a laser beam. The emitting portion 202 includes a switch 2022 configured to turn on or turn off the emitting portion 202. The mounting shaft 204 is installed to the emitting portion 202 and configured to install the wheel hub laser 200 onto a wheel hub of a vehicle. The observation target 206 is installed to the emitting portion 202. The observation target 206 is a rectangular plate, including an observation target plane 2060 configured to display the position of the laser beam reflected by the radar calibration component 400. An emitting hole 2062 is provided in the center of the observation target plane 2060 and configured to allow the laser beam to be emitted.

Figure 7:
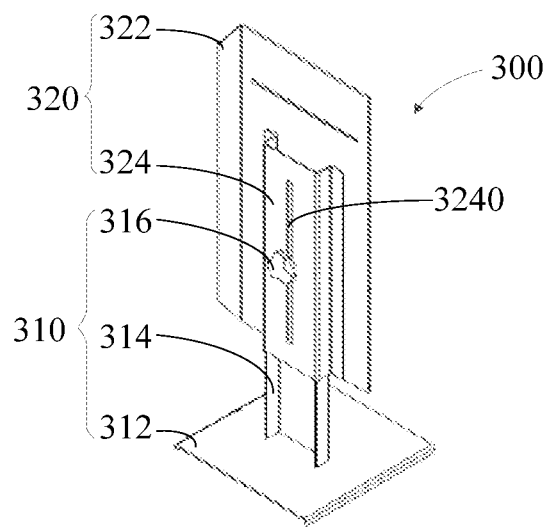
FIG. 7 is a three-dimensional view of a diaphragm of the calibration device shown in FIG. 1.
Figure 8:
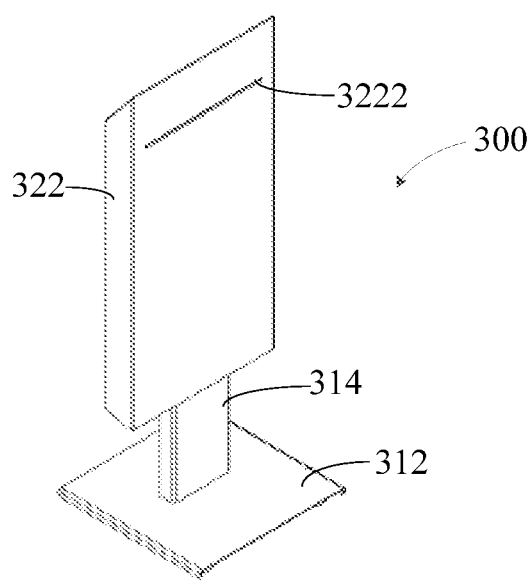
FIG. 8 is a three-dimensional view of the diaphragm shown in FIG. 7 from another angle of view.

Referring to FIG. 7 and FIG. 8 together, the diaphragm 300 includes a fixing base 310 and a sliding diaphragm 320.

The fixing base 310 includes a base 312, a fixing bracket 314 and a locking handle 316. The base 312 is a rectangular plate. One end of the fixing bracket 314 is installed on the center of the base 312. The fixing bracket 314 is perpendicular to the base 312. The fixing bracket 314 is strip-shaped. The locking handle 316 is installed on the fixing bracket 314.

The sliding diaphragm 320 includes a diaphragm portion 322 and a sliding groove portion 324. The diaphragm portion 322 is roughly of a plate shape and provided with a strip-shaped diaphragm groove 3222 configured to allow a laser beam to run through. The width of the diaphragm groove 3222 is slightly less than the diameter of a laser spot where the laser 200 emits the laser beam, to check whether the laser beam just runs through the diaphragm groove 3222. The sliding groove portion 324, installed on the diaphragm portion 322, is strip-shaped and sleeved on the fixing bracket 314. The sliding groove portion 324 can slide relative to the fixing bracket 314. The sliding groove portion 324 is provided with a strip-shaped groove 3240. The locking handle 316 runs through the groove 3240, to stably fix the sliding diaphragm 320 on the fixing base 310.

Figure 9:
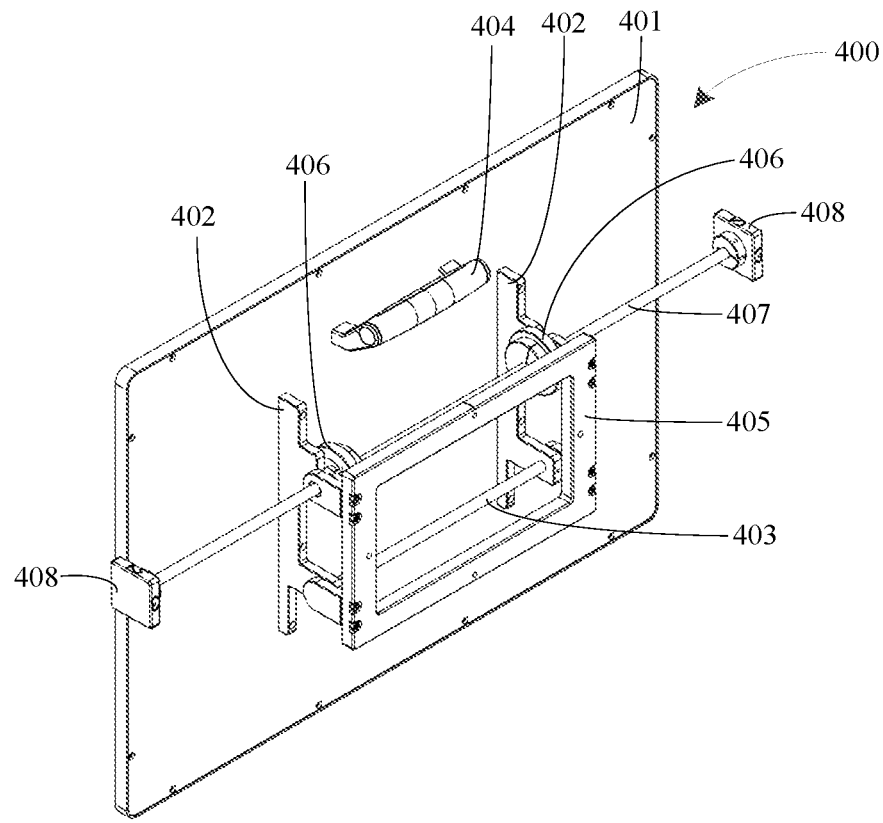
FIG. 9 is a three-dimensional view of a radar calibration component of the calibration device shown in FIG. 1.

Referring to FIG. 9, the radar calibration component 400 is of a shape of a rectangular plate, including a base board 401, mounting brackets 402, a fixed rotating shaft 403, a handle 404, an adjustment bracket 405, angle adjustment assemblies 406, an adjustment rod 407 and grips 408.

Figure 10:
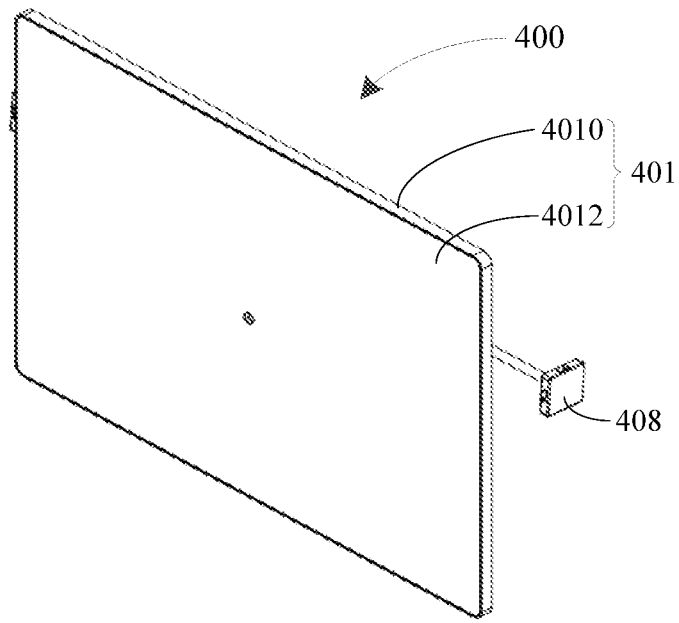
FIG. 10 is a three-dimensional view of the radar calibration component shown in FIG. 9 from another angle of view.

Referring to FIG. 10, the base board 401 is a rectangular plate, including a base board body 4010 and a reflection layer 4012. The base board body 4010 may be made of a lightweight material, for example, a plastic material, or a light metal material such as an aluminum alloy or a magnesium alloy. The reflection layer 4012 is disposed on a surface of the base board body 4010 and configured to reflect a laser beam emitted by the laser 200 and also a radar wave emitted by a vehicle-mounted radar. The reflection layer 4012 is a silver layer applied to a surface of the base board body 4010, which can reflect both a laser beam and a radar wave.

It is understandable that in some other embodiments, the reflection layer 4012 may be a light reflection layer made of another material and the base board body 4010 may be made of a material which can reflect a radar wave. Alternatively, the base board 401 includes both a light reflection layer and a radar wave reflection layer, with the radar wave reflection layer being disposed between the light reflection layer and the base board body 4010, provided that the base board 410 can reflect both a light beam and a radar wave. The shape of the base board 401 is not limited to a rectangle and may change according to an actual requirement. For example, the base board 401 may be circular.

Figure 11:
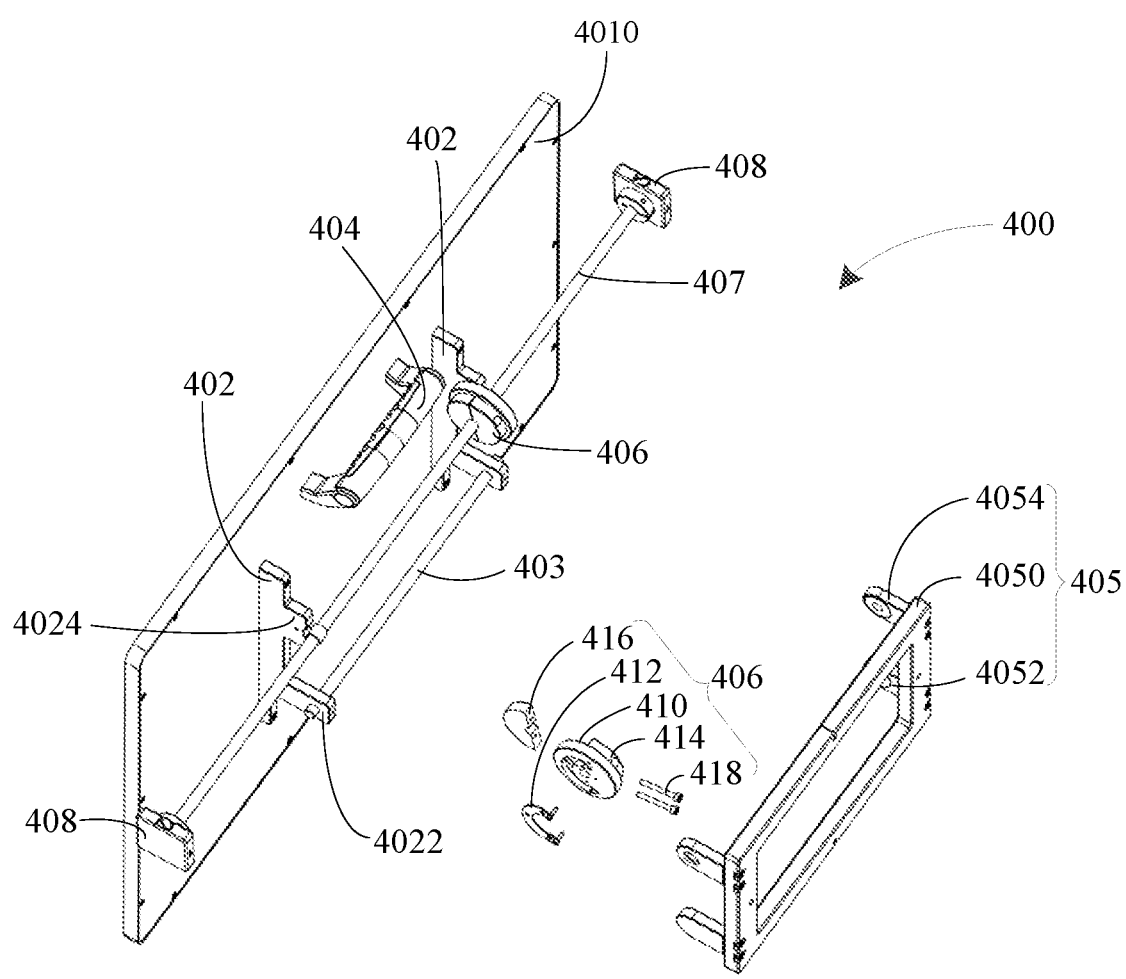
FIG. 11 is a partial exploded view of the radar calibration component shown in FIG. 9.
Figure 12:
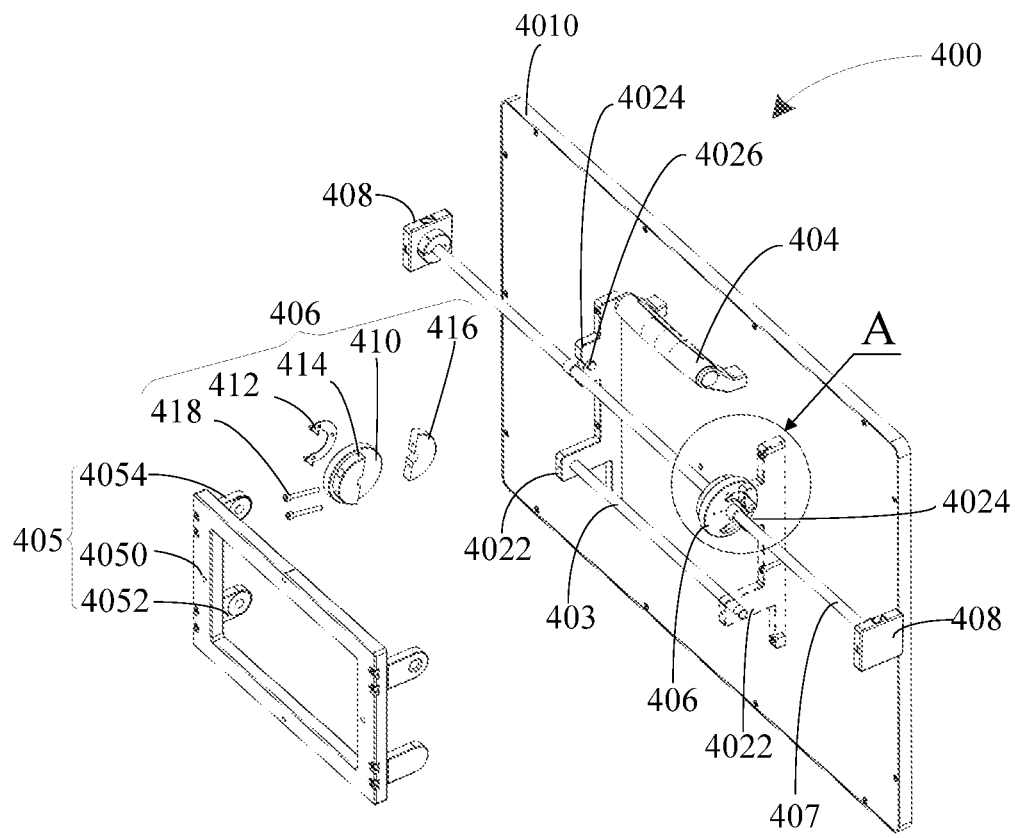
FIG. 12 is a partial exploded view of the radar calibration component shown in FIG. 9 from another angle of view.

Referring to FIG. 11 and FIG. 12, the mounting bracket 402 is of a plate shape and fixedly installed on the base board body 4010. The mounting bracket 402 and the reflection layer 4012 are respectively disposed on two opposite sides of the base board body 4010. There are two mounting brackets 402 at a preset interval. Both the mounting brackets 402 are disposed in the vertical direction (that is, the mounting brackets 402 are disposed in parallel). Each of the mounting brackets 402 includes a first mounting protrusion 4022 and a second mounting protrusion 4024. The first mounting protrusion 4022 is located below the second mounting protrusion 4024. Two first mounting protrusions 4022 of the two mounting brackets 402 are located on a same horizontal line, and two second mounting protrusions 4024 of the two mounting brackets 402 are located on another horizontal line. Each second mounting protrusion 4024 is provided with a convex column 4026. The convex column 4026 is cylindrical. Two convex columns 4026 are disposed along a same straight line and opposite to each other. The first mounting protrusion 4022 is provided with a mounting hole configured to install the fixed rotating shaft 403.

It is understandable that in some other embodiments, the quantity of mounting brackets 402 is not limited to two and may increase or decrease according to an actual requirement.

The fixed rotating shaft 403 passes through two mounting holes of the two first mounting protrusions 4022 and is disposed in the horizontal direction.

The handle 404 is installed on the base board body 4010. The handle 404 and the mounting brackets 402 are located on a same side of the base board body 4010. The handle 404 is configured to provide convenience in moving the radar calibration component 400.

The adjustment bracket 405 is detachably installed on the sliding component 30. The adjustment bracket 405 includes a bracket body 4050, first mounting lugs 4052 and second mounting lugs 4054. The bracket body 4050 is a frame structure and includes hollowed-out areas to reduce the weight. Both two first mounting lugs 4052 and two second mounting lugs 4054 are installed on a same side of the bracket body 4050. The two first mounting lugs 4052 are located on a same horizontal line and the two second mounting lugs 4054 are located on another horizontal line. The first mounting lugs 4052 and the second mounting lugs 4054 are each provided with a mounting hole. Two ends of the fixed rotating shaft 403 are respectively hinged to two mounting holes of the two first mounting lugs 4052, so that the base board 401 can rotate around the fixed rotating shaft 403 relative to the adjustment bracket 405.

Each angle adjustment assembly 406 includes a cam disc 410, a cam spring plate 412, a first clasping piece 414, a second clasping piece 416 and pins 418.

Figure 13:
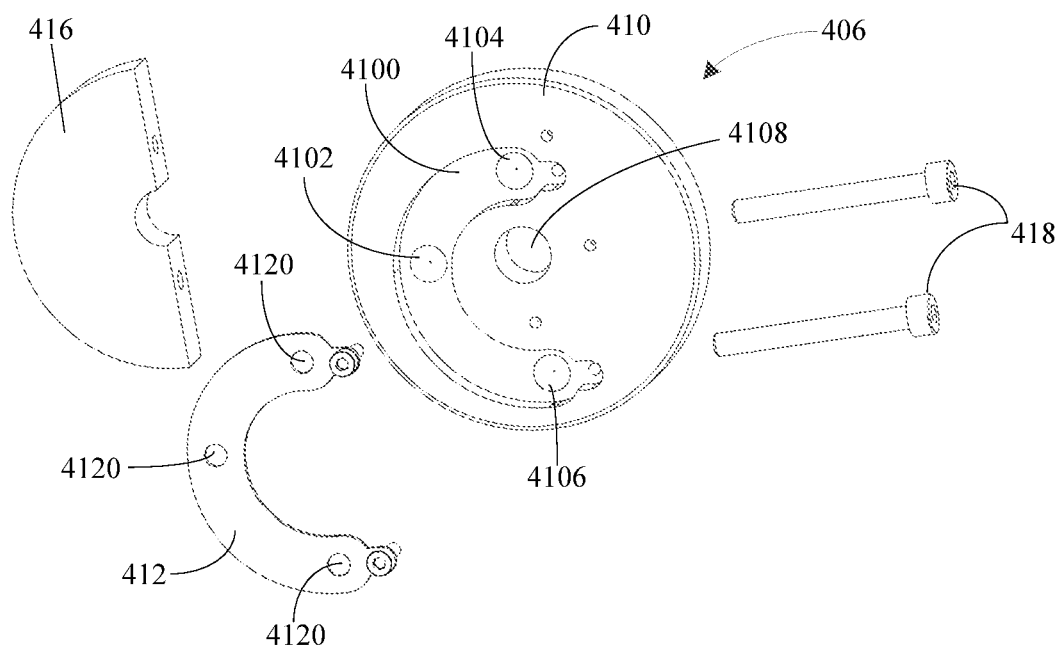
FIG. 13 is an exploded view of an angle adjustment assembly of the radar calibration component shown in FIG. 9.
Figure 14:
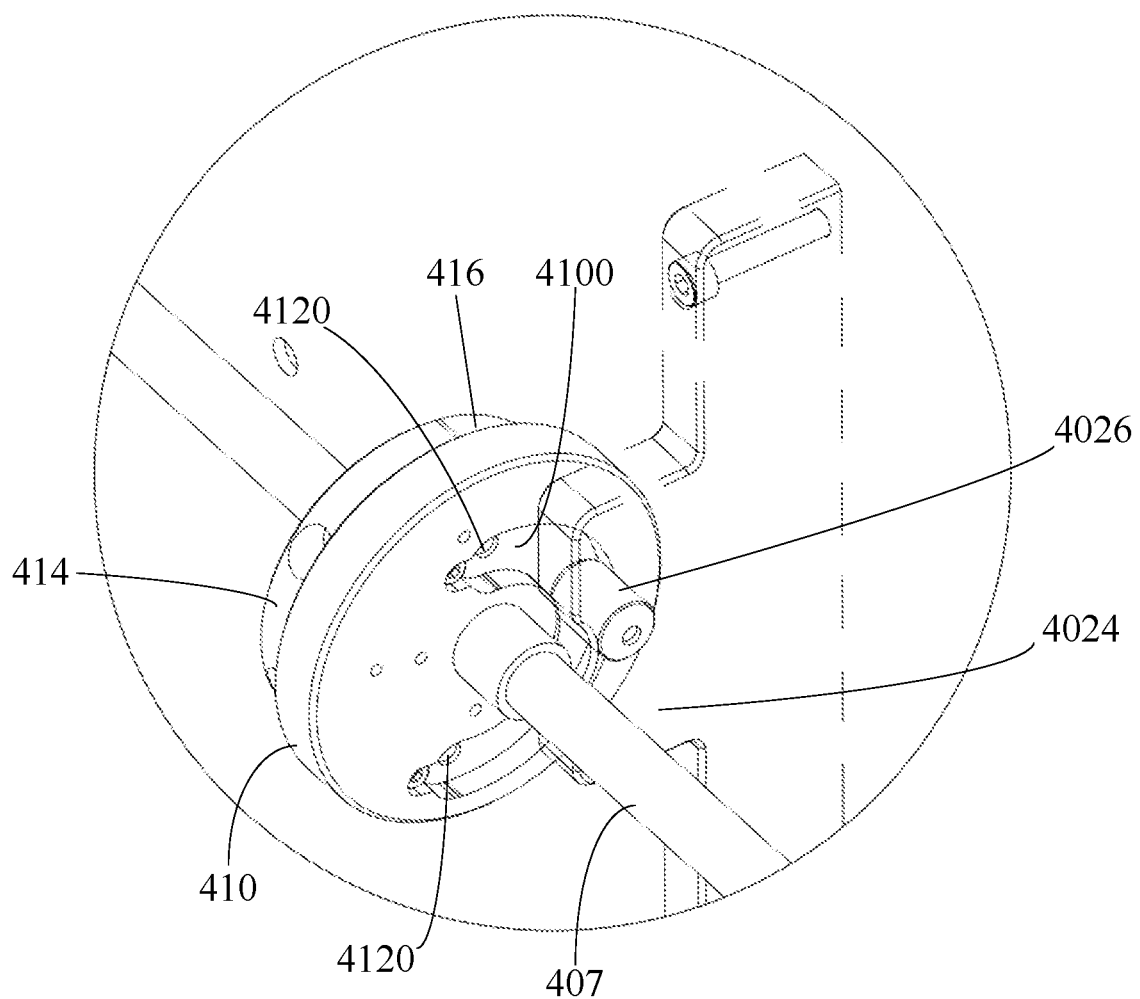
FIG. 14 is a partial enlarged view of a part A in FIG. 12.

Referring to FIG. 13 and FIG. 14 together, the cam disc 410 is discoid and a surface of the cam disc 410 is provided with a cam groove 4100. The cam groove 4100 includes three arcs with different curvatures and the three arcs are connected in descending order of curvatures. A bottom wall of the cam groove 4100 is provided with a first positioning hole 4102, a second positioning hole 4104 and a third positioning hole 4106. The first positioning hole 4102 is located between the second positioning hole 4104 and the third positioning hole 4106. The first positioning hole 4102 is disposed at a preset interval from the second positioning hole 4104 and a preset interval from the third positioning hole 4106. The cam disc 410 is provided with a central through hole 4108 at the center.

The shape and the size of the cam spring plate 412 are the same as the shape and the size of the cam groove 4100. The cam spring plate 412 also includes three arcs with different curvatures and the three arcs are connected in descending order of curvatures. The cam spring plate 412 includes three through holes 4120. The cam spring plate 412 is accommodated in the cam groove 4100 and fixed in the cam groove 4100 through a screw. Each of the first positioning hole 4102, the second positioning hole 4104 and the third positioning hole 4106 is aligned with a corresponding through hole 4120. The cam spring plate 412 may be made of a metal material such as bronze or aluminum, and may alternatively be made of an elastic plastic material.

The first clasping piece 414 is fixedly installed on a surface of the cam disc 410. The first clasping piece 416 and the cam spring plate 412 are respectively located on two opposite sides of the cam disc 410.

The second clasping piece 416 and the first clasping piece 414 form a disc. The disc and the cam disc 410 are coaxial.

The quantity of pins 418 is two. One end of each pin 418 penetrates through the first clasping piece 414 in a radial direction of the disc and is fixed on the second clasping piece 416. One end of each pin 418 is provided with a pin head and the other end is provided with an external thread portion. The pin head is abutted against the first clasping piece 414. The external thread portion fits the thread of the second clasping piece 416. The disc is formed by locking the first clasping piece 414 and the second clasping piece 416 through the pins 418.

The quantity of angle adjustment assemblies 406 is two. Each angle adjustment assembly 406 is installed on a corresponding convex column 4026. One end of each convex column 4026 is inserted into a corresponding cam groove 4100 and can slide along the corresponding cam groove 4100. When the convex column 4026 slides in the corresponding cam groove 4100, sliding friction occurs between the convex column 4026 and the cam spring plate 412 and the convex column 4026 can be inserted into the first positioning hole 4102, the second positioning hole 4104 and the third positioning hole 4106, to position the angle adjustment assembly 406. The quantity of adjustment gear positions of the radar calibration component 400 is the same as the quantity of positioning holes. In this embodiment, the quantity of adjustment gear positions of the radar calibration component 400 is three.

In this embodiment, both the quantity of mounting brackets 402 and the quantity of angle adjustment assemblies 406 are two. The adjustment bracket 405 includes two first mounting lugs 4052 and two second mounting lugs 4054, mainly to improve the stability of the radar calibration component 400 and reliability of angle adjustment. It is understandable that in some other embodiments, the quantity of mounting brackets 402, the quantity of angle adjustment assemblies 406, the quantity of first mounting lugs 4052 and the quantity of second mounting lugs 4054 may change according to an actual requirement, provided that each of the quantities is at least one. For example, there is one angle adjustment assembly 406, and correspondingly there is one second mounting protrusion 4024, one second mounting lug 4054 and one convex column 4026.

The adjustment rod 407 is horizontally disposed and passes through the center of each angle adjustment assembly 406. That is, the adjustment rod 407 passes through the central through hole 4108 of the cam disc 410 and also the center of the disc formed by the first clasping piece 414 and the second clasping piece 416. The first clasping piece 414 is fixedly installed on the cam disc 410. The first clasping piece 414 and the second clasping piece 416 are locked through the pins 418, so that the first clasping piece 414 and the second clasping piece 416 jointly clasp the adjustment rod 407. The angle adjustment assemblies 406 are fixedly installed on the adjustment rod 407 and can rotate with the adjustment rod 407. The adjustment rod 407 further passes through the mounting holes of the two second mounting lugs 4054 and is rotatably connected to the second mounting lugs 4054. When rotating, the adjustment rod 407 can drive the angle adjustment assemblies 406 to rotate together, the convex column 4026 slides in the cam groove 4100 and sliding friction occurs between the convex column 4026 and the cam spring plate 412. Because the cam groove 4100 includes three arcs with different curvatures, when the convex column 4026 slides in the cam groove 4100, the cam disc 410 pushes the base board 401 to rotate around the fixed rotating shaft 403, so that the cam disc 410 is close to or far away from the adjustment brackets 405. When the convex column 4026 is inserted into the first positioning hole 4102, the base board 401 stays in the first position. In this case, the base board 401 is vertically disposed. When the convex column 4026 is inserted into the second positioning hole 4104, the base board 401 stays in the second position. In this case, the upper end of the base board 401 is close to the adjustment brackets 405 and an angle between the base board 401 and the vertical direction is two degrees. When the convex column 4026 is inserted into the third positioning hole 4106, the base board 401 stays in the third position. In this case, the upper end of the base board 401 is far away from the adjustment brackets 405 and an angle between the base board 401 and the vertical direction is two degrees.

The cam disc 410 is provided with the cam groove 4100. The convex column 4026 can slide in the cam groove 4100 and push the base board 401 to steadily rotate around the fixed rotating shaft 403, to adjust an angle of the base board 401.

In addition, the cam spring plate 412 is installed in the cam groove 4100, the convex column 4026 slides in the cam groove 4100 and sliding friction occurs between the convex column 4026 and the cam spring plate 412, so that the convex column 4026 moves in the cam groove 4100 steadily and smoothly, improving steadiness of the base board 401 when rotating around the fixed rotating shaft 403.

Moreover, the bottom wall of the cam groove 4100 is provided with the first positioning hole 4102, the second positioning hole 4104 and the third positioning hole 4106, providing convenience in locating the base board 401 at a preset rotation angle.

Meanwhile, with the help of the first clasping piece 414, the second clasping piece 416 and the pins 418, the angle adjustment assemblies 406 can be fixedly installed on the adjustment rod 407 conveniently.

Two grips 408 are respectively fixedly installed on two ends of the adjustment rod 407 and configured to help with the rotation of the adjustment rod 407.

In the assembly process of the radar calibration component 400, the handle 404 is fixedly installed on the base board 401 and two mounting brackets 402 are fixedly installed on the base board 401 and disposed at a preset interval and in parallel. The mounting brackets 402 and the handle 404 are located on a same side of the base board 401. The fixed rotating shaft 403 is threaded through the two mounting holes of the two first mounting protrusions 4022 and fixedly installed on the first mounting protrusions 4022.

Two first mounting lugs 4052 are sleeved on two ends of the fixed rotating shaft 403 and movably connected to the fixed rotating shaft 403.

The adjustment rod 407 is sequentially threaded through a mounting hole of one second mounting lug 4054, two central through holes 4108 of the two cam discs 410 and the other second mounting lug 4054. The cam disc 410 is sleeved on the convex column 4024, so that the convex column 4024 is accommodated in the cam groove 4100 and abutted against the cam spring plate 412. The second clasping piece 416 is locked into the first clasping piece 414 through the pins 418 and the first clasping piece 414 and the second clasping piece 416 jointly clasp the adjustment rod 407, so that the angle adjustment assemblies 406 are fixedly installed on the adjustment rod 407.

In this embodiment, the cam groove 4100 includes three arcs with different curvatures. It is understandable that in some other embodiments, the quantity of arcs with different curvatures may change according to an actual requirement, provided that there are at least three arcs with different curvatures. The at least three arcs with different curvatures are connected in descending order of curvatures.

In this embodiment, the bottom wall of the cam groove 4100 is provided with three positioning holes: the first positioning hole 4102, the second positioning hole 4104 and the third positioning hole 4106. It is understandable that in some other embodiments, the quantity of positioning holes may increase according to an actual requirement, provided that at least the first positioning hole 4102, the second positioning hole 4104 and the third positioning hole 4106 are included.

It is understandable that in some other embodiments, the cam spring plate 412 may be omitted and sliding friction occurs between the convex column 4026 and the bottom wall of the cam groove 4100. The first clasping piece 414, the second clasping piece 416 and the pins 418 may be omitted and the adjustment rod 407 is fixedly connected to the two cam discs 410.

In the foregoing embodiment, an implementation of the angle adjustment assembly 406 of the radar calibration component 400 is illustrated by using an example in which the radar calibration component 400 can stay in three positions. Understandably, the quantity of positioning holes in the angle adjustment assembly 406 and the quantity of arcs with different curvatures in the cam groove may be set the same as the quantity of positions where the radar calibration component needs to stay. That is, if the radar calibration component needs to stay in N positions according to a calibration requirement, then the quantity of positioning holes in the angle adjustment assembly 406 may be set to N or to be greater than N, to satisfy a plurality of adjustment requirements on the position of the radar calibration component.

Figure 15:
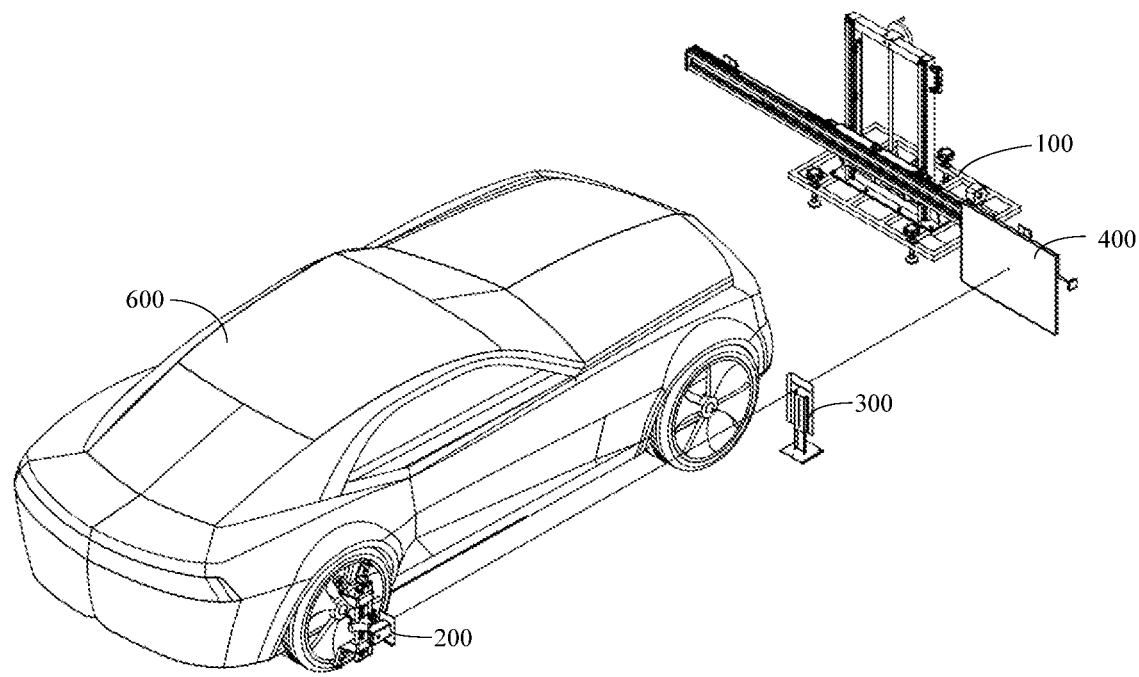
FIG. 15 is a schematic diagram of calibrating the vertical plane of the radar calibration component by using the calibration device in the embodiment of the present invention.

Referring to FIG. 15, in the first step of calibrating a vehicle-mounted radar, a vehicle 600 is horizontally disposed (that is, the vehicle 600 is parked on a horizontal plane), the bracket apparatus 100 is moved, through the rolling wheels 112, to be in front of and approximately one meter from the to-be-calibrated vehicle 600, so that the guide rails 212 are roughly parallel with the axle of the vehicle 600. The height adjustment components 114 are adjusted by observing the level instrument 214, so that the guide rails 212 are horizontally disposed. The radar calibration component 400 is installed on the sliding component 30, and the radar calibration component 400 and the sliding component 30 are moved along the guide rails 212 to one side of the to-be-calibrated vehicle 600. The base board 401 stays in the first position, that is, the base board 401 is vertically disposed. A wheel hub clamp is installed on a rear wheel of the vehicle 600 and the laser 200 is installed. The laser 200 is turned on, so that a laser beam emitted by the laser 200 illuminates the reflection layer 4012 of the radar calibration component 400. The diaphragm 300 is taken and placed between the laser 200 and the radar calibration component 400 and the diaphragm portion 322 is disposed perpendicular to the laser beam. The height of the diaphragm groove 3222 is adjusted to the height of the emitting hole 2302 of the laser 200. The emission angle of the laser 200 is adjusted and the diaphragm 300 is moved to an appropriate position, so that the laser 200 emits the laser beam in the horizontal direction and the laser beam emitted by the laser 200 is parallel with the central axis plane of the to-be-calibrated vehicle 600 and passes through the center of the diaphragm groove 3222. According to an actual situation, the sliding component 30 is moved and/or heights of the guide rails 212 are adjusted, so that the position of the radar calibration component 400 is adjusted to enable the laser beam to illuminate the radar calibration component 400. The position to which the laser beam is reflected is observed, the bracket apparatus 100 is moved and the height adjustment components 114 are adjusted, so that the laser beam reflected by the reflection layer 4012 can just return along an original route and be projected to the emitting hole 2302 of the laser 200. In this case, calibration on the vertical plane of the radar calibration component 400 is completed. The guide rails 212 are perpendicular to the central axis plane of the vehicle 600. The base board 401 is vertically disposed and also perpendicular to the central axis plane of the vehicle 600.

In this embodiment, when the vehicle 600 is horizontally disposed, the central axis plane of the vehicle 600 is vertically disposed and the vehicle 600 is symmetrical relative to the central axis plane.

Figure 16:
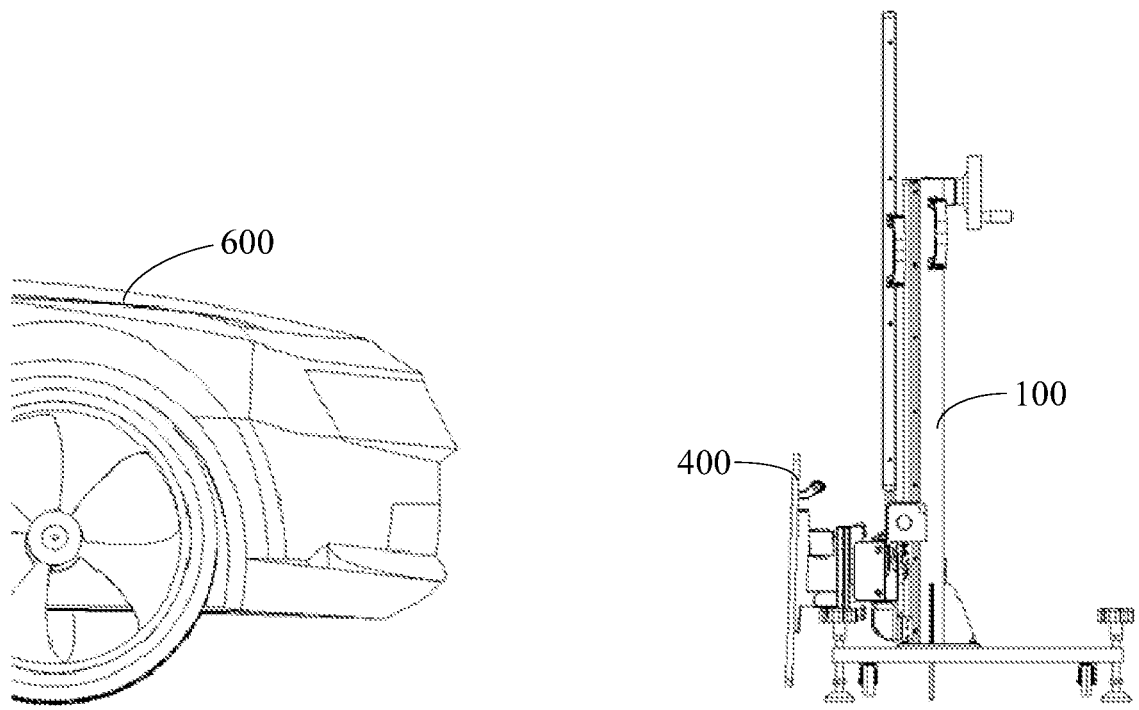
FIG. 16 to FIG. 18 are schematic diagrams of calibrating a vehicle-mounted radar by using the calibration device in the embodiment of the present invention.
Figure 17:
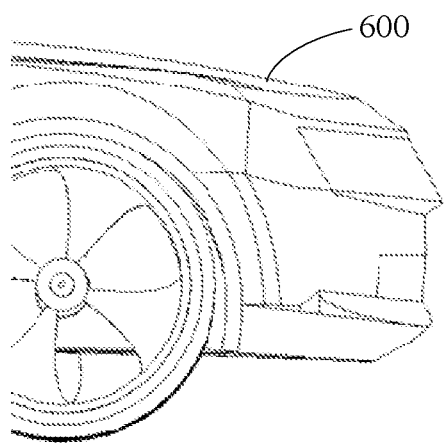
Figure 17:
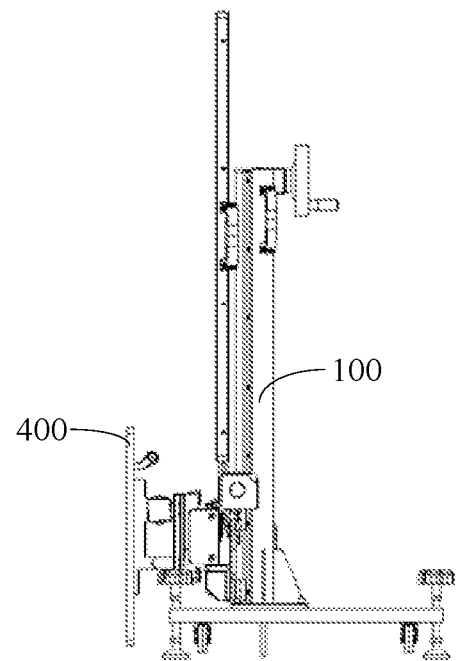
Figure 18:
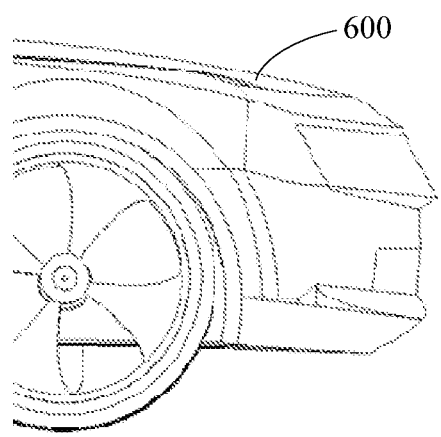
Figure 18:
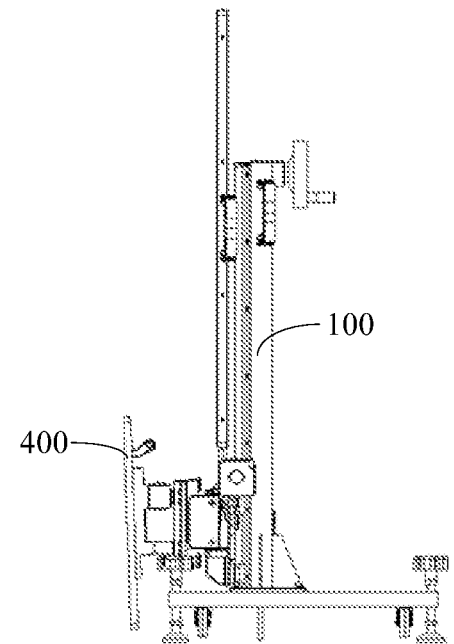

Referring to FIG. 12, FIG. 13, and FIG. 16 to FIG. 18 together, in the second step of calibrating the vehicle-mounted radar, the vehicle-mounted radar is installed in the vehicle 600. The automobile ADAS diagnosis and analysis instrument is connected to a communication interface of an on-board diagnostics (OBD) system in the vehicle. The radar calibration component 400 is moved along the guide rails 212 to the middle of the vehicle-mounted radar to ensure that the center of the radar calibration component 400 and the center of the vehicle-mounted radar are maintained on a same straight line. The vehicle-mounted radar is turned on and emits a radar wave to the radar calibration component 400. The radar wave may be a laser radar or a millimeter wave radar. Referring to FIG. 16, the adjustment rod 407 is rotated through the grips 408 and the base board 401 rotates around the fixed rotating shaft 403, so that the convex column 4026 is inserted into the second positioning hole 4104, the upper end of the base board 401 is far away from the vehicle 600 and the base board 401 is at an angle of two degrees to the vertical direction. Observation is performed through the automobile ADAS diagnosis and analysis instrument. Referring to FIG. 17, the adjustment rod 407 is rotated through the grips 408 and the base board 401 rotates around the fixed rotating shaft 403, so that the convex column 4026 is inserted into the first positioning hole 4102 and the base board 401 is vertically disposed, thereby enabling the reflection layer 4012 to reflect the radar wave to the center of the vehicle-mounted radar. Observation is performed through the automobile ADAS diagnosis and analysis instrument. Referring to FIG. 18, the adjustment rod 407 is rotated through the grips 408, the base board 401 rotates around the fixed rotating shaft 403 and the upper end of the base board 401 is close to the vehicle 600 (that is, the upper end of the base board 401 is far away from the bracket apparatus 100), so that the convex column 4026 is inserted into the third positioning hole 4106 and the base board 401 is at an angle of two degrees to the vertical direction. Observation is performed through the automobile ADAS diagnosis and analysis instrument. After the foregoing three operations are completed, current mounting position deviations and dB value deviations of the vehicle-mounted radar are obtained through the automobile ADAS diagnosis and analysis instrument and a vertical adjustment bolt of the vehicle-mounted radar is adjusted according to the operation guidance of the automobile ADAS diagnosis and analysis instrument, so that deviation values of the radar wave reflected to the vehicle-mounted radar fall within an allowable range. In this case, calibration on the vehicle-mounted radar is completed.

It is understandable that in some other embodiments, a vertical plane calibration apparatus in the prior art may be used to calibrate the vertical plane of the base board 401, so that the base board 401 is perpendicular to the central axis plane of the vehicle 600. Then the radar calibration component 400 is used to reflect a radar wave emitted by the vehicle-mounted radar to the vehicle-mounted radar. Current mounting position deviations and dB value deviations of the vehicle-mounted radar are obtained through the automobile ADAS diagnosis and analysis instrument and the vertical adjustment bolt of the vehicle-mounted radar is adjusted, so that deviation values of the radar wave reflected to the vehicle-mounted radar fall within an allowable range. In this case, calibration on the vehicle-mounted radar is completed. In addition, the angle is not limited to two degrees, provided that the angle is less than an allowable angle deviation value of the vehicle-mounted radar. Persons skilled in the technical field should understand that if a vertical plane calibration apparatus in the prior art is used to calibrate the vertical plane of the radar calibration component 400, the radar calibration component 400 does not need to reflect a light beam. That is, the radar calibration component 400 does not need to have the function of reflecting light and only needs to reflect a radar wave, which means that the radar calibration component 400 may include only the base board 401 and the radar wave reflection layer, or the radar wave reflection layer may be omitted if the base board 401 is made of a material that can reflect a radar wave.

In this embodiment, after the vertical plane of the base board 401 is calibrated, the radar calibration component 400 is used to reflect a radar wave emitted by the vehicle-mounted radar to the vehicle-mounted radar. Therefore, the radar calibration component 400 can be used to calibrate vehicle-mounted radars of different types of vehicles, providing convenience in vehicle-mounted radar calibration.

In addition, in three states in which the base board 401 is vertically disposed, the base board 401 is at a positive angle to the vertical direction and the base board 401 is at a negative angle to the vertical direction, mounting position deviations and dB value deviations of the vehicle-mounted radar may be recorded and then accurately calibrated.

Moreover, the vertical plane of the base board 401 can be calibrated by using the radar calibration component 400, the diaphragm 300 and the laser 200. The radar calibration component 400 can be used not only to calibrate the vertical plane of the base board 401, but also to calibrate the vehicle-mounted radar. Therefore, the quantity of elements of the vehicle-mounted radar calibration device 500 is reduced, costs are lowered and calibration operations are also simplified.

Meanwhile, the radar calibration component 400 can slide horizontally along the guide rails 212. When there is a plurality of vehicle-mounted radars in one vehicle, after calibration on one vehicle-mounted radar is completed, the radar calibration component 400 can be moved to be in front of another vehicle-mounted radar to be calibrated. It is not required to horizontally calibrate the guide rails 212 again, thereby providing convenience in calibrating a plurality of vehicle-mounted radars in one vehicle.

Figure 19:
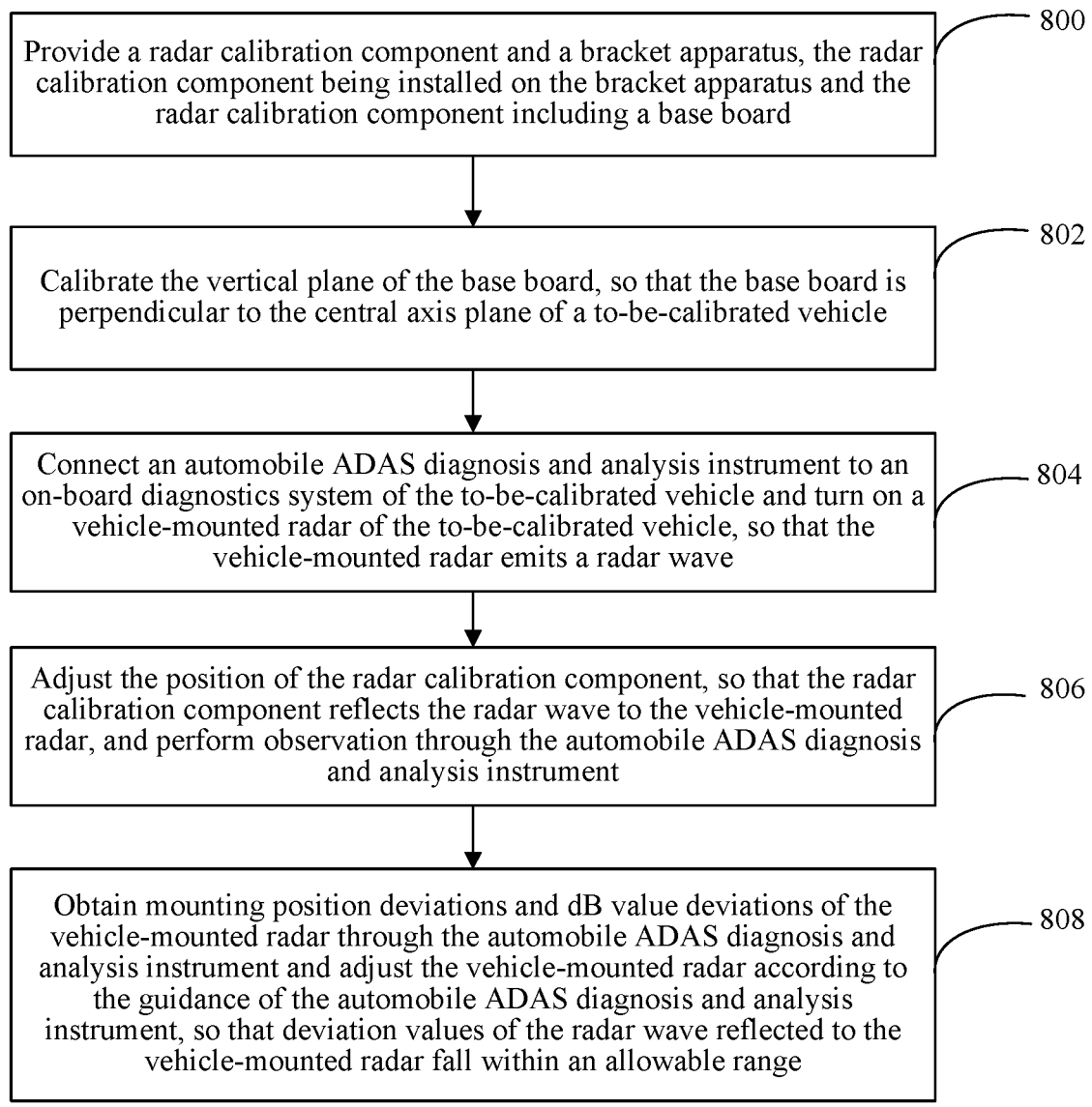
FIG. 19 is a flowchart of a vehicle-mounted radar calibration method according to another embodiment of the present invention.

Another embodiment of the present invention provides a vehicle-mounted radar calibration method. The method is implemented by using the vehicle-mounted radar calibration device 500 provided in the foregoing embodiment. Referring to FIG. 19, the method includes the following steps.

800: Provide a radar calibration component and a bracket apparatus, the radar calibration component being installed on the bracket apparatus and the radar calibration component including a base board.

802: Calibrate the vertical plane of the base board, so that the base board is perpendicular to the central axis plane of a to-be-calibrated vehicle.

804: Connect an automobile ADAS diagnosis and analysis instrument to an on-board diagnostics system of the to-be-calibrated vehicle and turn on a vehicle-mounted radar of the to-be-calibrated vehicle, so that the vehicle-mounted radar emits a radar wave.

806: Adjust the position of the radar calibration component, so that the radar calibration component reflects the radar wave to the vehicle-mounted radar, and perform observation through the automobile ADAS diagnosis and analysis instrument.

808: Obtain mounting position deviations and dB value deviations of the vehicle-mounted radar through the automobile ADAS diagnosis and analysis instrument and adjust the vehicle-mounted radar according to the guidance of the automobile ADAS diagnosis and analysis instrument, so that deviation values of the radar wave reflected to the vehicle-mounted radar fall within an allowable range.

The vehicle-mounted radar is installed in the to-be-calibrated vehicle 600. The automobile ADAS diagnosis and analysis instrument is connected to a communication interface of the on-board diagnostics system in the vehicle. The radar calibration component 400 is moved along the guide rails 212 to the middle of the vehicle-mounted radar to ensure that the center of the radar calibration component 400 and the center of the vehicle-mounted radar are maintained on a same straight line and the base board 401 is vertically disposed. The vehicle-mounted radar is turned on and emits a radar wave to the radar calibration component 400. The radar wave may be a laser radar or a millimeter wave radar. Observation is performed through the automobile ADAS diagnosis and analysis instrument, and the position of the radar calibration component 400 and the vertical adjustment bolt are adjusted, so that the radar calibration component reflects the radar wave to the vehicle-mounted radar. Mounting position deviations and dB value deviations of the vehicle-mounted radar are obtained through the automobile ADAS diagnosis and analysis instrument and the vehicle-mounted radar is adjusted according to the guidance of the automobile ADAS diagnosis and analysis instrument, so that deviation values of the radar wave reflected to the vehicle-mounted radar fall within an allowable range.

In this embodiment, after the vertical plane of the base board 401 is calibrated, the radar calibration component is used to reflect a radar wave emitted by the vehicle-mounted radar to the vehicle-mounted radar. Therefore, the radar calibration component 401 can be used to calibrate vehicle-mounted radars of different types of vehicles, providing convenience in vehicle-mounted radar calibration.

In some embodiments, the bracket apparatus 100 includes guide rails 212. The radar calibration component 400 is installed on the guide rails 212 and can slide horizontally along the guide rails 212. When there is a plurality of vehicle-mounted radars in one vehicle, after calibration on one vehicle-mounted radar is completed, the radar calibration component 400 can be moved to be in front of another vehicle-mounted radar to be calibrated. It is not required to horizontally calibrate the guide rails 212 again, thereby providing convenience in calibrating a plurality of vehicle-mounted radars in one vehicle.

Figure 20:
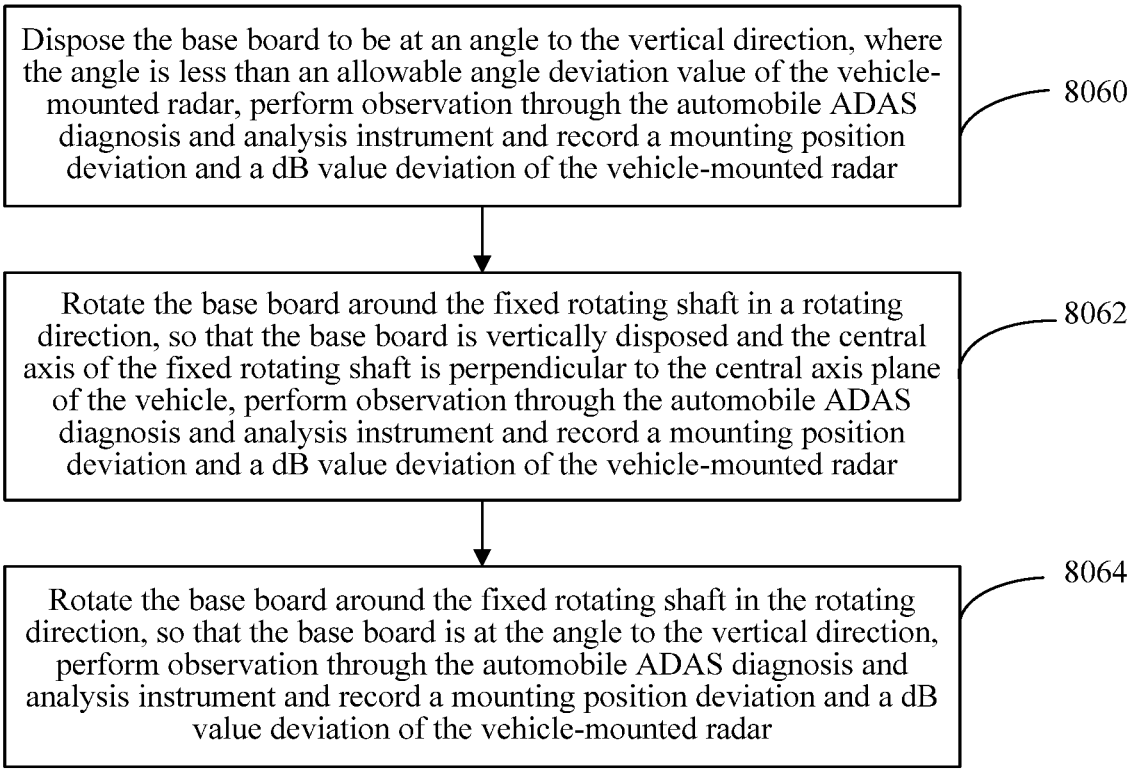
FIG. 20 is a specific flowchart of a step of the vehicle-mounted radar calibration method shown in FIG. 19.

Referring to FIG. 20, in some embodiments, the step 806 of adjusting the position of the radar calibration component, so that the radar calibration component reflects the radar wave to the vehicle-mounted radar, and observing through the automobile ADAS diagnosis and analysis instrument includes the following steps.

8060: Dispose the base board to be at an angle to the vertical direction, where the angle is less than an allowable angle deviation value of the vehicle-mounted radar, perform observation through the automobile ADAS diagnosis and analysis instrument and record a mounting position deviation and a dB value deviation of the vehicle-mounted radar.

The adjustment rod 407 is rotated through the grips 408, the base board 401 rotates around the fixed rotating shaft 403 in the first rotating direction, the upper end of the base board 401 is far away from the vehicle 600 and the base board 401 is at an angle to the vertical direction, so that the convex column 4026 is inserted into the second positioning hole 4104 and the base board 401 is located in the second position. The central axis of the fixed rotating shaft 403 is perpendicular to the central axis plane of the vehicle. The angle may be two degrees. Observation is performed through the automobile ADAS diagnosis and analysis instrument, and a mounting position deviation and a dB value deviation of the vehicle-mounted radar are recorded when the base board 401 is located in the second position.

8062: Rotate the base board around the fixed rotating shaft in a rotating direction, so that the base board is vertically disposed and the central axis of the fixed rotating shaft is perpendicular to the central axis plane of the vehicle, perform observation through the automobile ADAS diagnosis and analysis instrument and record a mounting position deviation and a dB value deviation of the vehicle-mounted radar.

The adjustment rod 407 is rotated through the grips 408, and the base board 401 rotates around the fixed rotating shaft 403 in a rotating direction, so that the convex column 4026 is inserted into the first positioning hole 4102 and the base board 401 is vertically disposed in the first position. Observation is performed through the automobile ADAS diagnosis and analysis instrument, and a mounting position deviation and a dB value deviation of the vehicle-mounted radar are recorded when the base board 401 is located in the first position.

8064: Rotate the base board around the fixed rotating shaft in the rotating direction, so that the base board is at the angle to the vertical direction, perform observation through the automobile ADAS diagnosis and analysis instrument and record a mounting position deviation and a dB value deviation of the vehicle-mounted radar.

The adjustment rod 407 is rotated through the grips 408, the base board 401 continues to rotate around the fixed rotating shaft 403 in the rotating direction, the upper end of the base board 401 is close to the vehicle 600 and the base board 401 is at the angle to the vertical direction, so that the convex column 4026 is inserted into the third positioning hole and the base board 401 is located in the third position. Observation is performed through the automobile ADAS diagnosis and analysis instrument, and a mounting position deviation and a dB value deviation of the vehicle-mounted radar are recorded when the base board 401 is located in the third position.

In this embodiment, in three states in which the base board 401 is vertically disposed, the base board 401 is at a positive angle to the vertical direction and the base board 401 is at a negative angle to the vertical direction, mounting position deviations and dB value deviations of the vehicle-mounted radar may be recorded and then accurately calibrated.

Figure 21:
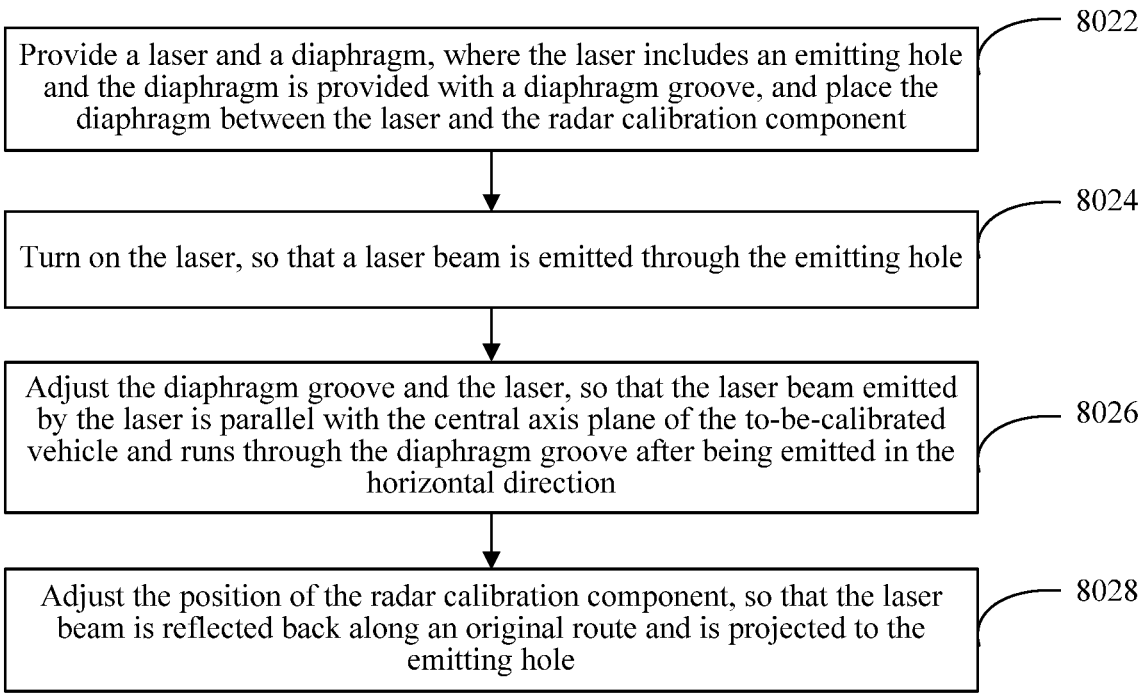
FIG. 21 is a specific flowchart of another step of the vehicle-mounted radar calibration method shown in FIG. 19.

Referring to FIG. 21, in some embodiments, the step 802 of calibrating the vertical plane of the base board, so that the base board is perpendicular to the central axis plane of a to-be-calibrated vehicle includes the following steps.

8022: Provide a laser and a diaphragm, where the laser includes an emitting hole and the diaphragm is provided with a diaphragm groove, and place the diaphragm between the laser and the radar calibration component.

8024: Turn on the laser, so that a laser beam is emitted through the emitting hole.

8026: Adjust the diaphragm groove and the laser, so that the laser beam emitted by the laser is parallel with the central axis plane of the to-be-calibrated vehicle and runs through the diaphragm groove after being emitted in the horizontal direction.

The diaphragm 300 is placed between the laser 200 and the radar calibration component 400 and the diaphragm portion 322 is disposed perpendicular to the laser beam. The height of the diaphragm groove 3222 is adjusted to the height of the emitting hole 4302 of the laser 200. The emission angle of the laser 200 is adjusted and the diaphragm 300 is moved to an appropriate position, so that the laser beam emitted by the laser 200 is parallel with the central axis plane of the to-be-calibrated vehicle 800 and passes through the center of the diaphragm groove 3222 after being emitted in the horizontal direction.

8028: Adjust the position of the radar calibration component, so that the laser beam is reflected back along an original route and is projected to the emitting hole.

According to an actual situation, the sliding component 30 is moved and/or heights of the guide rails 212 are adjusted, so that the position of the radar calibration component 400 is adjusted to enable the laser beam to illuminate the reflection layer 4012 of the radar calibration component 400. The position to which the laser beam is reflected is observed, the bracket apparatus 100 is moved and the height adjustment components 114 are adjusted, to adjust the position of the radar calibration component 400, so that the laser beam reflected by the reflection layer 4102 can return along an original route and be projected to the emitting hole 2302 of the laser 200. In this case, calibration on the vertical plane of the base board 401 is completed. The base board 401 is vertically disposed and perpendicular to the central axis plane of the vehicle 600.

In this embodiment, the vertical plane of the base board 401 of the radar calibration component 400 can be calibrated by using the radar calibration component 400, the diaphragm 300 and the laser 200. The radar calibration component 400 can be used not only to calibrate the vertical plane of the base board 401, but also to calibrate the vehicle-mounted radar. Therefore, the quantity of elements of the vehicle-mounted radar calibration device 500 is reduced, costs are lowered and calibration operations are also simplified.

It should be noted that in this embodiment of the present invention, the method is implemented by using the vehicle-mounted radar calibration device 500 provided in the foregoing embodiment. For technical details not described in detail in the method embodiment, refer to the descriptions of the vehicle-mounted radar calibration device 500 in the embodiments of the present invention.

In the end, it should be noted that the foregoing embodiments are merely intended to describe the technical solutions of the present invention, but not to limit the present invention. Based on the idea of the present invention, the technical characteristics described in the foregoing embodiments or different embodiments may be combined with each other, the steps may be carried out in any sequence and there exist many other changes, which are not provided in detail for brevity, in different aspects of the present invention as described in the foregoing embodiments. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A vehicle-mounted radar calibration device, comprising:
   a bracket apparatus;
   a radar calibration component, configured to be installed on the bracket apparatus;
   the radar calibration component comprising a base board, an adjustment bracket, an adjustment rod, mounting brackets, and angle adjustment assemblies, the adjustment bracket being hinged to the adjustment rod, wherein:
   each angle adjustment assembly comprises a cam disc and a cam spring plate, the cam disc is provided with a cam groove, and the cam spring plate is fixedly installed in the cam groove, the cam spring plate comprises at least three through holes and each of a first positioning hole, a second positioning hole and a third positioning hole is aligned with a corresponding through hole;
   each mounting bracket is provided with a convex column, the convex column is abutted against the cam spring plate, and a sliding friction occurs between the convex column and the cam spring plate when the convex column slides in the cam groove;
   the radar calibration component is configured to reflect a radar wave, emitted by a vehicle-mounted radar of a to-be-calibrated vehicle, to the vehicle-mounted radar after calibration on the vertical plane of the base board is completed, to calibrate the vehicle-mounted radar; and
   the angle adjustment assemblies are configured to adjust the base board, so that the base board can stay in at least two positions and therefore the radar calibration component reflects the radar wave emitted by the vehicle-mounted radar to the vehicle-mounted radar in the at least two positions.

2. The vehicle-mounted radar calibration device according to claim 1, wherein the bracket apparatus comprises guide rails; and the radar calibration component is configured to be installed on the guide rails and the radar calibration component can horizontally slide along the guide rails.

3. The vehicle-mounted radar calibration device according to claim 2, wherein the bracket apparatus comprises a sliding component;

the sliding component is movably installed on the guide rails and can slide along the guide rails; and the radar calibration component is configured to be installed on the guide rails through the sliding component and the radar calibration component can horizontally slide with the sliding component along the guide rails.

4. The vehicle-mounted radar calibration device according to claim 2, wherein the bracket apparatus comprises:

a bracket assembly; and a beam assembly, installed on the bracket assembly, wherein the beam assembly can move in the vertical direction relative to the bracket assembly, the beam assembly comprises the guide rails and the guide rails are horizontally disposed.

5. The vehicle-mounted radar calibration device according to claim 4, wherein the beam assembly comprises a level instrument configured to check whether the guide rails are horizontally disposed.

6. The vehicle-mounted radar calibration device according to claim 2, wherein the bracket assembly comprises a bracket body and height adjustment components; and at least three height adjustment components are installed on a bottom surface of the bracket body and configured to adjust a horizontal angle of the bracket body and a pitching angle of the bracket body.

7. The vehicle-mounted radar calibration device according to claim 6, wherein there are three height adjustment components distributed as an isosceles triangle, the three height adjustment components are configured to collaboratively adjust the horizontal angle of the bracket body, and the height adjustment component at the apex of the isosceles triangle is configured to adjust the pitching angle of the bracket body.

8. The vehicle-mounted radar calibration device according to claim 6, wherein the bracket assembly comprises a base bracket and a pole bracket, one end of the pole bracket is connected to the base bracket and the base bracket supports the pole bracket;

the beam assembly is installed on the pole bracket;

the base bracket comprises rolling wheels, the bracket body and the height adjustment components; and there are at least three rolling wheels installed on the bottom surface of the bracket body for convenience of moving the base bracket.

9. The vehicle-mounted radar calibration device according to claim 8, wherein the pole bracket comprises a lifting screw rod;

the lifting screw rod is disposed in the vertical direction; and the beam assembly is sleeved on the lifting screw rod and fits the thread of the lifting screw rod, and when rotating around the central axis of the lifting screw rod, the lifting screw rod can drive the beam assembly to move along the lifting screw rod in the vertical direction.

10. The vehicle-mounted radar calibration device according to claim 9, wherein the pole bracket comprises a lifting guide rail;

the lifting guide rail comprises poles disposed in the vertical direction; and the beam assembly is movably installed on the poles and the poles are configured to guide the beam assembly to move in the vertical direction.

11. The vehicle-mounted radar calibration device according to claim 10, wherein the lifting guide rail comprises a rail installed on the poles in the horizontal direction; and one end of the lifting screw rod is installed on the rail and the other end of the lifting screw rod is installed on the bracket body.

12. The vehicle-mounted radar calibration device according to claim 10, wherein the lifting guide rail comprises a rail and a bottom rail;

two poles are disposed in the vertical direction, in parallel and at a preset interval;

the rail is disposed in the horizontal direction and two ends of the rail are respectively installed on the two poles;

the bottom rail is fixedly installed on the bracket body and an end of each pole far away from the rail is fixedly installed on the bottom rail; and one end of the lifting screw rod is fixedly installed on the rail and the other end of the lifting screw rod is fixedly installed on the bottom rail.

13. The vehicle-mounted radar calibration device according to claim 10, wherein the pole bracket comprises a height gauge installed on the poles in the vertical direction and configured to measure a moving distance of the beam assembly in the vertical direction.

14. The vehicle-mounted radar calibration device according to claim 9, wherein the beam assembly comprises a support component and the guide rails;

the support component comprises a support body and a moving block;

the moving block is fixedly installed on the support body and sleeved on the lifting screw rod, and the moving block fits the thread of the lifting screw rod; and the guide rails are fixedly installed on the support body in the horizontal direction.

15. The vehicle-mounted radar calibration device according to claim 14, wherein the pole bracket comprises poles disposed in the vertical direction; and the support component comprises sliding blocks fixedly installed on the support body and the sliding blocks are movably installed on the poles and can slide along the poles.

16. The vehicle-mounted radar calibration device according to claim 14, wherein two clamping portions respectively extend from two opposite sides of the support body, the two clamping portions are strip-shaped and disposed in the horizontal direction, in parallel and at a preset interval;

two guide rails are respectively installed on the two clamping portions and disposed in the horizontal direction at a preset interval; and the sliding component is movably installed on the guide rails through a sliding bearing.

17. A vehicle-mounted radar calibration device, comprising:

a bracket apparatus;

a radar calibration component, configured to be installed on the bracket apparatus;
the radar calibration component comprising a base board, an adjustment rod, and angle adjustment assemblies;
each angle adjustment assembly comprising a first clasping piece, a second clasping piece, a cam disc, and pins; wherein:
the first clasping piece being fixedly installed on the cam disc;
the adjustment rod being clasped between the first clasping piece and the second clasping piece;
one end of each pin penetrates through the first clasping piece and is fixed on the second clasping piece, locking the first clasping piece into the second clasping piece, so that the adjustment rod is clasped between the first clasping piece and the second clasping piece and the angle adjustment assembly rotates with the adjustment rod;
the radar calibration component is configured to reflect a radar wave, emitted by a vehicle-mounted radar of a to-be-calibrated vehicle, to the vehicle-mounted radar after calibration on the vertical plane of the base board is completed, to calibrate the vehicle-mounted radar; and
the angle adjustment assemblies are configured to adjust the base board, so that the base board can stay in at least two positions and therefore the radar calibration component reflects the radar wave emitted by the vehicle-mounted radar to the vehicle-mounted radar in the at least two positions.

* * * * *